US010732964B2

(12) United States Patent
Krishnappa et al.

(10) Patent No.: US 10,732,964 B2
(45) Date of Patent: Aug. 4, 2020

(54) SYSTEMS AND METHODS FOR UPDATING MULTI-TIER CLOUD-BASED APPLICATION STACKS

(71) Applicant: Oracle International Corporation, Redwood Shores, CA (US)

(72) Inventors: Nagendra Krishnappa, Bangalore (IN); Biju Narayanan, Trivandrum (IN); Aneesh Azhakesan Sujatha, Kollam (IN); Milind Xete Chatim Aldoncar, Goa (IN); Deepankar Narayanan, Trivandrum (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/137,845

(22) Filed: Sep. 21, 2018

(65) Prior Publication Data
US 2019/0087176 A1 Mar. 21, 2019

Related U.S. Application Data

(60) Provisional application No. 62/561,599, filed on Sep. 21, 2017.

(51) Int. Cl.
*G06F 9/44* (2018.01)
*G06F 8/658* (2018.01)
*G06F 16/907* (2019.01)
*G06F 8/656* (2018.01)
*G06F 9/4401* (2018.01)

(52) U.S. Cl.
CPC ............ *G06F 8/658* (2018.02); *G06F 8/656* (2018.02); *G06F 16/907* (2019.01); *G06F 9/4401* (2013.01)

(58) Field of Classification Search
CPC ..................................................... G06F 8/658
USPC ........................................................ 717/168
See application file for complete search history.

(56) References Cited

U.S. PATENT DOCUMENTS

| 5,155,847 | A | * | 10/1992 | Kirouac ................ G06F 8/65 709/221 |
| 5,864,875 | A | * | 1/1999 | Van Huben ............ G06F 17/50 |
| 8,327,190 | B2 | * | 12/2012 | Shinboku ............ G06F 11/0775 714/26 |
| 8,782,632 | B1 | | 7/2014 | Chigurapati et al. |
| 8,863,114 | B2 | * | 10/2014 | Shah .......................... G06F 8/60 717/175 |
| 9,015,702 | B2 | | 4/2015 | Bhat |

(Continued)

OTHER PUBLICATIONS

International Application No. PCT/US2018/052131, received an International Search Report and Written Opinion dated Dec. 7, 2018, 11 pages.

(Continued)

*Primary Examiner* — Evral E Bodden
(74) *Attorney, Agent, or Firm* — Kilpatrick Townsend & Stockton, LLP

(57) ABSTRACT

The present disclosure relates to automatically and periodically updating a multi-tier application stack in a cloud environment. More particularly, the present disclosure relates to systems and methods that access a central server to determine if new updates have been released, and when new updates have been released, automatically apply the new updates to an application environment with minimal network burden and service interruption.

20 Claims, 15 Drawing Sheets

(56) References Cited

U.S. PATENT DOCUMENTS

| | | |
|---|---|---|
| 9,298,443 B2 | 3/2016 | Dias De et al. |
| 9,417,897 B1 | 8/2016 | Klompje et al. |
| 9,594,548 B2 | 3/2017 | Pena et al. |
| 9,817,651 B2 | 11/2017 | Viswanathan et al. |
| 9,858,064 B2* | 1/2018 | Mitchell ............... G06F 8/65 |
| 9,870,268 B2 | 1/2018 | Dippenaar et al. |
| 2010/0281473 A1* | 11/2010 | Zhang .................. G06F 8/65 717/171 |
| 2011/0271278 A1 | 11/2011 | Dittrich |
| 2013/0254755 A1 | 9/2013 | Yousouf et al. |
| 2016/0041819 A1 | 2/2016 | Mantena et al. |
| 2016/0378547 A1 | 12/2016 | Brouwer et al. |

OTHER PUBLICATIONS

Google Cloud Forum, "Updating Managed Instance Groups", retrieved from https://cloud.google.com/compute/docs/instance-groups/updating-managed-instance-groups, last updated Feb. 14, 2018, 21 pages.
"Update Sets", retrieved from https://docs.servicenow.com/bundle/istanbul-application-development/page/build/system-update-sets/concept/c_UpdateSets.html, Feb. 21, 2018, 2 pages.
PCT/US2018/052131 received an International Preliminary Report on Patentabillty dated Apr. 2, 2020, 8 pages.

* cited by examiner

| | Bug Number | Bug Description |
|---|---|---|
| 1 | 26305347 | PEOPLECODE ERROR AFTER CLICKING THE PUBLISH AS A GROUPLET BUTTON |
| 2 | 26447451 | FLUID CONTENT - CLASSIC FEATURE CHECKIN |
| 3 | 26532275 | COMMON FUNCTIONS DELIVERED IN FUNCLIB RECORD |
| 4 | 26537043 | FLUID CONTENT - SEPARATE CLASSIC AND FLUID FUNCTIONALITY |
| 5 | 13954691 | WPTG_LEGAL_OSN: INCORRECT COPYRIGHT STRINGS PSFT/COMMON COMPONENTS (EO): ICE/ECC |
| 6 | 19616849 | WHEN APPROVAL PROCESS SETUP DEFINITION ID CHANGED GETTING ERROR FOR PO SELF-APPR |
| 7 | 21767289 | EC: VOUCHER APPROVAL HISTORY PAGE NOT DISPLAYING LATEST APPROVAL FLOW |
| 8 | 21873102 | WORKFLOW ICONS ARE NOT ALIGNED PROPERLY IN PT 8.54 WITH APPLICATION VERSION 9.1 |
| 9 | 21893025 | IN EVENT SUMMARY PAGE, GRID TITLE IS MISSING SAYS MESSAGE NOT FOUND (18111,3024) |
| 10 | 22093199 | OK BUTTON NOT BEING DISPLAYED WHEN USING THE DESIGN FORM WIZARD |
| 11 | 22107608 | WORKLIST STATUS IS UED TO 2 AUTOMATICALLY IF AWE STEPS ADHOC REVIEWS |

Cloud Manager Settings

Edit Attributes

Cloud Manager Updates

No Updates Available for Cloud Manager

| Update Step | | Status | Step Details |
|---|---|---|---|
| 1 | Create new environment templates to deploy PUM source | Skipped | ? |
| 2 | Deploy PUM source environment | Success | ? |
| 3 | Install Change Assistant and configure PUM source and target database | Success | ? |
| 4 | Apply PRP to PUM source | Success | ? |
| 5 | Define a make the current change package | Success | ? |
| 6 | Create make me current change package | Success | ? |
| 7 | Apply change package to Cloud Manager target database | Success | ? |
| 8 | Update files on Cloud Manager target | Success | ? |

8 rows

SYSTEMS AND METHODS FOR UPDATING MULTI-TIER CLOUD-BASED APPLICATION STACKS

RELATED APPLICATIONS

This application claims the benefit and priority under 35 U.S.C. 119 (e) of U.S. Provisional Application Ser. No. 62/561,599, filed Sep. 21, 2017, entitled "SYSTEMS AND METHODS FOR UPDATING MULTI-TIER CLOUD-BASED APPLICATION STACKS," the contents of which is herein incorporated by reference in its entirety for all purposes.

TECHNICAL FIELD

The present disclosure relates to automatically and periodically updating a multi-tier application stack in a cloud network environment. More particularly, the present disclosure relates to systems and methods that periodically (e.g., on a regular or irregular interval) access a central server to determine if new updates to an application have been released. When new updates to the application have been released, the systems and methods automatically apply the new updates to an application environment associated with the application with minimal network burden and service interruption.

BACKGROUND

Generally, an application stack may be implemented using multiple tiers, including a web tier (e.g., web server), an application tier (e.g., an application server), and a database tier (e.g., a database server). Software components may be independently running on each of these tiers. The software components of the various tiers may be configured to communicate within the same server or across multiple servers. Further, these servers may be virtual machines or physical machines, running within the same datacenter or across datacenters in different regions. Over time, the application stack may need to be updated, for example, to fix bugs or add functionality to services provided using the application stack. Updating the application stack typically involves hiring vendors to update and test the different software components of each tier to test for issues arising out of installing the software components. However, this updating process is burdensome on network resources because complex application stacks can be very large (e.g., 1 terabyte) and the servers typically need to be taken offline for long periods of time to enable testing of the servers.

Even in application environments without a traditional application stack, applications can have dependencies on various resources or components in the cloud network environment. Updating the application by overwriting the image of the application may destroy these dependencies, causing further bugs and/or failures. After the application image was overwritten, the manager of the application environment would need to follow up on the update process by reconnecting or reestablishing all of those dependencies. Such a follow-up process is tedious in general, but even more tedious in larger application environments with large numbers of these dependencies.

SUMMARY

Certain aspects and features of the present disclosure relate to systems and methods for automatically updating a multi-tier application stack in a cloud environment with minimal burden on processing resources and limited server downtime. In particular, certain embodiments relate to an application running on an application stack in a cloud environment (e.g., the 3-tier model of an application, including a web server hosting the web code, an application server hosting the application code, and a database server providing database services). The application can be configured to periodically communicate with a central server (e.g., an update server, a central server, and the like) to check for new updates to the application stack. Updates to the application stack can be periodically stored (e.g., at a regular or irregular interval) at the central server. Non-limiting examples of an update may include update images and patchsets that are configured to fix application bugs and/or to add or modify features of the application. Update images (e.g., major releases issued once a quarter) may be data packages that include all bug fixes and new features of a particular version of the application. Patchsets (e.g., minor bug fixes issued between the major releases) may be data packages that contain individual bug fixes that were reported since the last update image was released. In some embodiments, an update may be in the form of a binary change to an object (e.g., a bug fix) included in the application code of the application. If a new update is available for downloading from the central server, the application can download the new updates to a network location associated with the application stack (e.g., downloading the new updates to a repository associated with the application stack).

In some embodiments, the application is associated with a currently running instance in a production environment. The currently running instance may correspond to a version of the application that does not include the new updates stored in the central server (e.g., an old version of the application that has yet to be updated and/or the most recent version of the application on which the new update has not yet been installed). The application can be configured to spawn a virtual machine and run a new instance of the application stack on the virtual machine. Further, the application can install the downloaded new updates on the new instance of the application. For example, the new instance with the installed new updates would incorporate any bug fixes or new features that were included in the new updates. Additionally, the application may compare the currently running instance with the new instance to identify whether there are any differences. For example, a difference between the currently running instance and the new instance may represent a new update (e.g., a newly added object into the application code, a new feature added to the application, a fixed bug in the binary code of the application, etc.) that is included in the new instance. The differences that were detected during the comparison can be serialized into an update data package and exported to the currently running instance for installation. The update data package can be installed in the currently running instance, and as a result, the current instance would be updated with the new bug fixes and/or new features. For example, installing the update data package in the currently running instance can include identifying the objects associated with the detected differences (e.g., file reference objects modified, deleted, or added by the new updates) and incorporating the modified, deleted, or added objects into the application code stored at the application server of the currently running instance. The new update can update the software components that run on any of the multiple tiers. To illustrate, and as a non-limiting example, the new updates can fix bugs in the software components of the web server without updating the software components of the database server. In some embodiments, an application environment can include dependencies on one or more components (e.g., software components) on which the application environment depends (e.g., the executable image of the application environment is different because of these dependencies).

In some embodiments, the comparison of the currently running instance to the new instance can be implemented by comparing metadata associated with the currently running instance to metadata associated with the new instance (which includes the new updates). In some embodiments, the metadata associated with either or both of the currently running instance and the new instance can include software feature flags, identifiers of file reference objects included in code, installation or execution settings or other metadata parameters. In these embodiments, comparing the metadata between the currently running instance of the new instance can include comparing feature flags enabled/disabled in the old instance with feature flags enabled/disabled in the new instance, comparing installation or execution setting or parameter values in the old instance to installation or execution setting or parameter values in the new instance, comparing identifiers of file reference objects of the currently running instance with identifiers of file reference objects of the new instance to identify which file reference objects have been modified, deleted, or added into the code. In some embodiments, the metadata associated with the currently running instance can include one or more bug numbers. A bug number can uniquely identify a bug report that describes a bug that was fixed or modified for the current instance. Similarly, the metadata associated with the new instance, which includes the new updates, can also include one or more bug numbers representing the bugs that were fixed for the new instance. When the set of bug numbers associated with the currently running instance differs from the set of bug numbers associated with the new instance, the application can determine that an update was performed on the new instance. The application can query and retrieve the bug reports for the bugs that were fixed for the new instance, but not for the currently running instance (e.g., the delta between the bug numbers). Each bug number and/or bug report is associated with one or more objects (e.g., file reference objects) that facilitated, implemented, or executed the bug fix. The bug numbers that are different between the set of bug numbers for the currently running instance and the set of bug numbers for the new instance can be identified and exported, and the identified bug numbers can be performed or executed on the currently running instance, which results in updating the currently running instance to include the updates in the new instance.

In some embodiments, the new updates may include a source code with changes to one or more objects involving a database server. The change to the one or more objects may be added to the metadata associated with the new updates as a file reference object, which represents the changed objects, and stored in a source directory. For example, a file reference object may have an identifier that is stored in a metadata table for future reference and extraction. As another example, a binary change to a code, file, or script (e.g., a change in a java file, such as a Java Archive (JAR) file) can be added to the metadata of the code, file, or script as a file reference object. A file reference object represents a path directing to a network location where the file is deployed. In these embodiments, when the currently running instance is compared to the new instance, the difference between the file reference objects of the currently running instance and the new instance can be stored, serialized, and applied to the currently running instance.

Advantageously, certain embodiments of the present invention can automatically update a multi-tier application stack while the application is operating in a production environment. Further, the technical problem of burdened and/or interrupted network resources during application updates is solved by the technical point of novelty described above and herein. For instance, comparing the metadata of the new virtual instance of the application with the metadata of the original or currently running instance of the application (i.e., the application running in a production environment), and installing the metadata representing the differences detected based on the comparison improves usage of processing resources in the cloud network environment and reduces service interruptions of the application stack. Additionally, the multi-tier application stack can be updated regardless of a size of the update or a number of iterations or versions of the application that were issued between the version of the currently running instance and the version of the new instance.

BRIEF DESCRIPTION OF THE DRAWINGS

The specification makes reference to the following appended figures, in which use of like reference numerals in different figures is intended to illustrate like or analogous components.

FIG. 6-8 are example interfaces according to certain embodiments.

DETAILED DESCRIPTION

In the following description, for the purposes of explanation, specific details are set forth in order to provide a thorough understanding of embodiments of the invention. However, it will be apparent that various embodiments may be practiced without these specific details. The figures and description are not intended to be restrictive.

Many types of computing systems and applications generate vast amounts of data pertaining or resulting from operation of that computing system or application. These vast amounts of data are frequently then stored into collected locations, such as log files/records, which can be reviewed at a later time period if there is a need to analyze the behavior or operation of the system or application.

While the below description may describe embodiments by way of illustration with respect to "log" data, processing of other types of data are further contemplated. Therefore, embodiments are not to be limited in its application only to log data. In addition, the following description may also interchangeably refer to the data being processed as "records" or "messages", without intent to limit the scope of the invention to any particular format for the data.

Figure 1A:
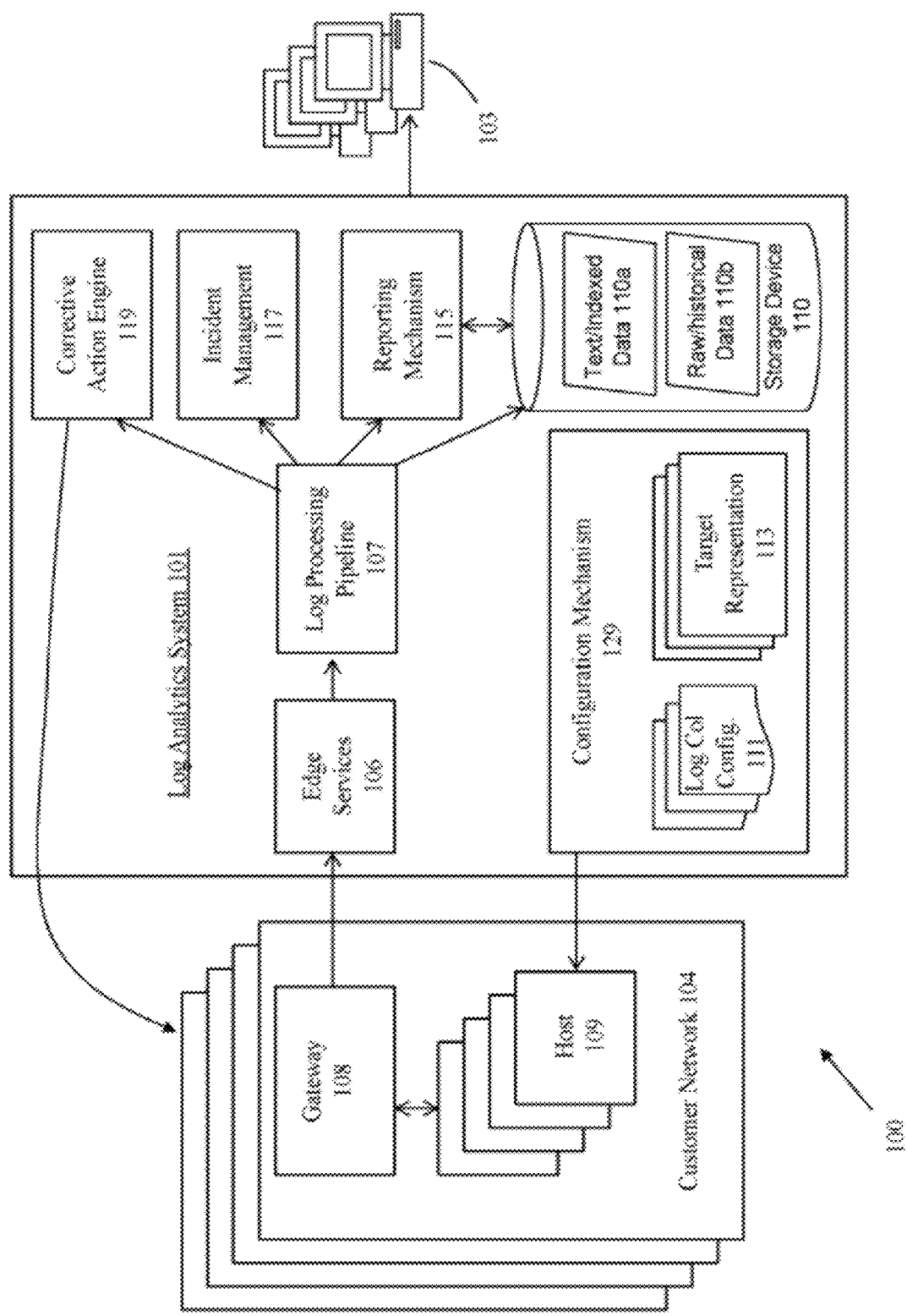
FIG. 1A illustrates an example system for configuring, collecting, and analyzing log data according to some embodiments of the present disclosure.

FIG. 1A illustrates an example system 100 for configuring, collecting, and analyzing log data according to some embodiments of the invention. System 100 includes a log analytics system 101 that in some embodiments is embodied as a cloud-based and/or SaaS-based (software as a service) architecture. This means that log analytics system 101 is capable of servicing log analytics functionality as a service on a hosted platform, such that each customer that needs the service does not need to individually install and configure the service components on the customer's own network. The log analytics system 101 is capable of providing the log analytics service to multiple separate customers, and can be scaled to service any number of customers.

Each customer network 104 may include any number of hosts 109. The hosts 109 are the computing platforms within the customer network 104 that generate log data as one or more log files. The raw log data produced within hosts 109 may originate from any log-producing source. For example, the raw log data may originate from a database management system (DBMS), database application (DB App), middleware, operating system, hardware components, or any other log-producing application, component, or system. One or more gateways 108 are provided in each customer network to communicate with the log analytics system 101.

The system 100 may include one or more users at one or more user stations 103 that use the system 100 to operate and interact with the log analytics system 101. The user station 103 comprises any type of computing station that may be used to operate or interface with the log analytics system 101 in the system 100. Examples of such user stations include, for example, workstations, personal computers, mobile devices, or remote computing terminals. The user station comprises a display device, such as a display monitor, for displaying a user interface to users at the user station. The user station also comprises one or more input devices for the user to provide operational control over the activities of the system 100, such as a mouse or keyboard to manipulate a pointing object in a graphical user interface to generate user inputs. In some embodiments, the user stations 103 may be (although not required to be) located within the customer network 104.

The log analytics system 101 comprises functionality that is accessible to users at the user stations 101, where log analytics system 101 is implemented as a set of engines, mechanisms, and/or modules (whether hardware, software, or a mixture of hardware and software) to perform configuration, collection, and analysis of log data. A user interface (UI) mechanism generates the UI to display the classification and analysis results, and to allow the user to interact with the log analytics system.

Figure 1B:
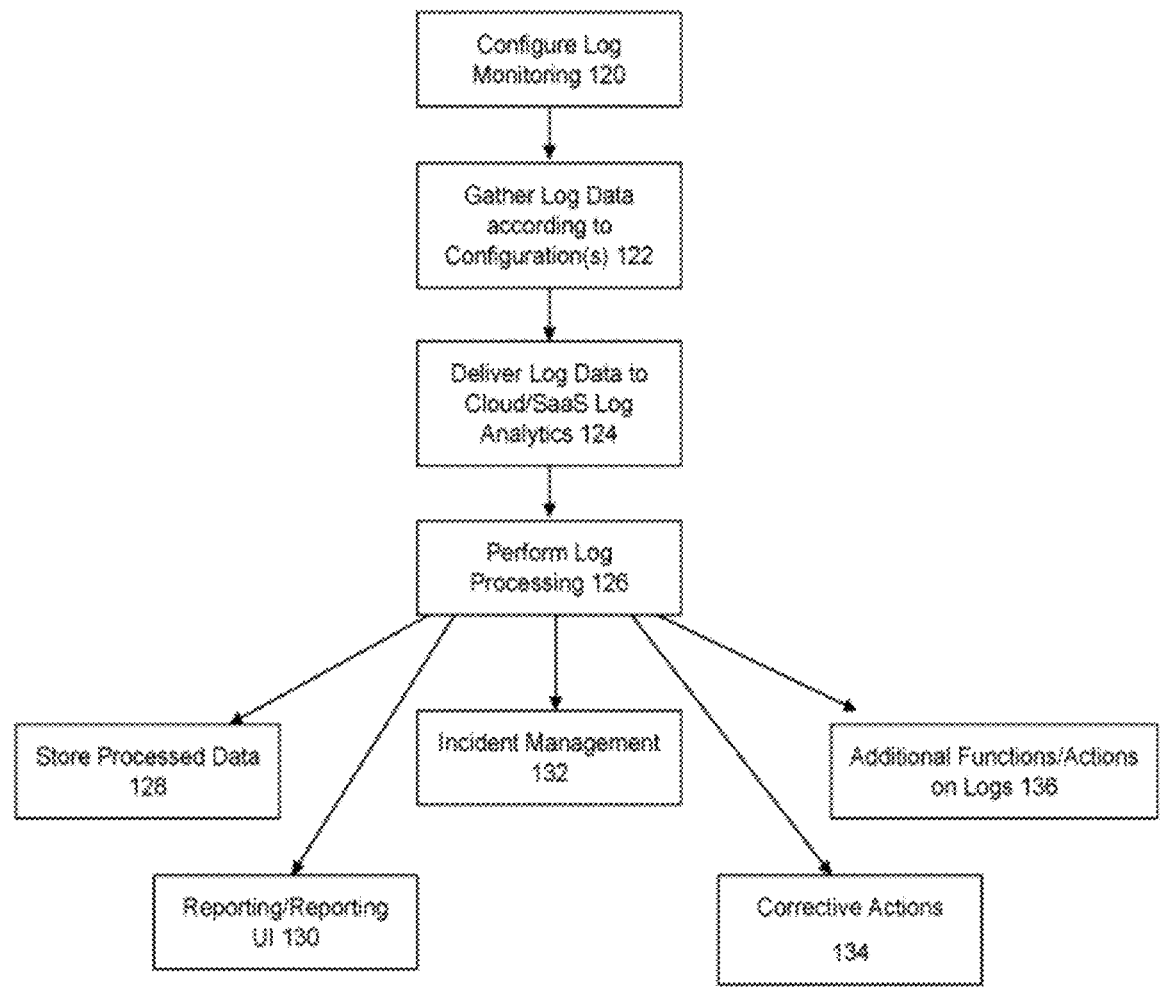
FIG. 1B illustrates a flowchart of an approach to use a system to configure, collect, and analyze log data.

FIG. 1B shows a flowchart of an approach to use system 100 to configure, collect, and analyze log data. This discussion of FIG. 1B will refer to components illustrated for the system 100 in FIG. 1A.

At 120, log monitoring is configured within the system. This may occur, for example, by a user/customer to configure the type of log monitoring/data gathering desired by the user/customer. Within system 101, a configuration mechanism 129 comprising UI controls is operable by the user to select and configure log collection configuration 111 and target representations 113 for the log collection configuration.

The log collection configuration 111 comprises the set of information (e.g., log rules, log source information, and log type information) that identify what data to collect (e.g., which log files), the location of the data to collect (e.g., directory locations), how to access the data (e.g., the format of the log and/or specific fields within the log to acquire), and/or when to collect the data (e.g., on a periodic basis). The log collection configuration 111 may include out-of-the-box rules that are included by a service provider. The log collection configuration 111 may also include customer-defined/customer-customized rules.

The target representations 113 identify "targets", which are individual components within the customer environment that that contain and/or produce logs. These targets are associated with specific components/hosts in the customer environment. An example target may be a specific database application, which is associated with one or more logs and/or one or more hosts.

The next action at 122 is to capture the log data according to the user configurations. The log data may originate from any log-producing source location, such as a database management system, database application, middleware, hardware logs, operating system logs, application logs, application server logs, database server logs, and any other type of log that monitors the behavior of a system or application.

In some instances, the association between the log rules 111 and the target representations is sent to the customer network 104 for processing. An agent of the log analytics system is present on each of the hosts 109 to collect data from the appropriate logs on the hosts 109.

In some embodiments, data masking may be performed upon the captured data. The masking is performed at collection time, which protects the customer data before it leaves the customer network. For example, various types of information in the collected log data (such as user names and other personal information) may be sensitive enough to be masked before it is sent to the server. Patterns are identified for such data, which can be removed and/or changed to proxy data before it is collected for the server. This allows the data to still be used for analysis purposes, while hiding the sensitive data. Some embodiments permanently remove the sensitive data (e.g., change all such data to"***" symbols), or changed to data that is mapped so that the original data can be recovered.

At 124, the collected log data is delivered from the customer network 104 to the log analytics system 101. The multiple hosts 109 in the customer network 104 provide the collected data to a smaller number of one or more gateways 108, which then sends the log data to edge services 106 at the log analytics system 101. The edge services 106 receives the collected data one or more customer networks, perform any intake processing (e.g., applying grammar rules to transform each message into a normalized message or skeleton message that lacks components of inter-cluster message variability and assigning each transformed message to an initial cluster identified using a hash of the transformed message) and may place the data into an inbound data store for further processing by a log processing pipeline 107.

At 126, the log processing pipeline 107 performs a series of data processing and analytical operations upon the collected log data. In various instances, the processing and analytical operations can include actions performed prior to storing the data and/or by performing actions on data retrieved from a data store. For example, one or more log messages may be assigned to initial clusters at an ingest time (e.g., upon receiving the log message(s) from a source), and the log message(s) may be subsequently retrieved in response to a query to modify or supplement the initial clustering and generate statistics and/or presentations based on the clustering.

At 128, the processed data is then stored into a data storage device 110. The computer readable storage device 110 comprises any combination of hardware and software that allows for ready access to the data that is located at the computer readable storage device 110. For example, the computer readable storage device 110 could be implemented as computer memory operatively managed by an operating system. The data in the computer readable storage device 110 could also be implemented as database objects, cloud objects, and/or files in a file system. In some embodiments, the processed data is stored within both a text/indexed data store 110a (e.g., as a SOLR cluster) and a raw/historical data store 110b (e.g., as a HDFS cluster).

A SOLR cluster corresponds to an Apache™ open source local search platform. The SOLR cluster can use a search library to perform full-text indexing and searching of data stored in a HDFS cluster. The SOLR cluster can provide APIs compatible with various languages to interface the searching functions with other programs and applications. Indexing can be performed in near real-time. The cluster can operate on a set of servers so as to facilitate fault tolerance and availability. Indexing and search tasks can be distributed across the set of servers.

An HDFS cluster corresponds to a Hadoop Distributed File System cluster. The HDFS cluster can include many (e.g., thousands) of servers to host storage (e.g., directly attached storage) and execute tasks, such as tasks defined by user applications. The HDFS cluster can include a master/slave architecture with a single master server for managing a namespace of the cluster. A file can be divided into blocks to be stored at multiple DataIIodes of the HDFS cluster. The master server can perform file operations (e.g., open, close, etc.) and determine which blocks are to be stored on which data nodes. The master server can communicate with data nodes for requests to read or write data in response to receipt of corresponding file operations.

Figure 2:
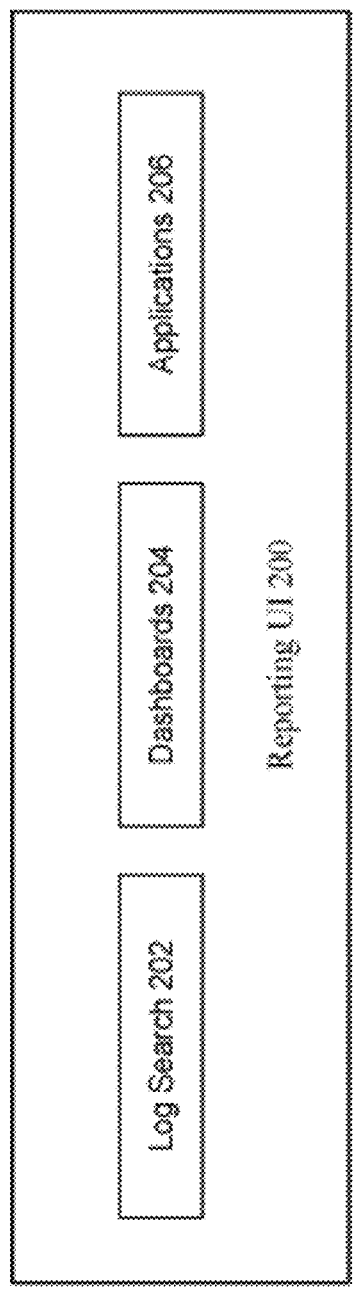
FIG. 2 illustrates an example of a reporting user interface.

At 130, reporting may be performed on the processed data using a reporting mechanism/UI 115. As illustrated in FIG. 2, the reporting UI 200 may include a log search facility 202, one or more dashboards 204, and/or any suitable applications 206 for analyzing/viewing the processed log data. Examples of such reporting components are described in more detail below.

At 132, incident management may be performed upon the processed data. One or more alert conditions can be configured within log analytics system such that upon the detection of the alert condition, an incident management mechanism 117 provides a notification to a designated set of users of the incident/alert.

At 134, a Corrective Action Engine 119 may perform any necessary actions to be taken within the customer network 104. For example, a log entry may be received that a database system is down. When such a log entry is identified, a possible automated corrective action is to attempt to bring the database system back up. The customer may create a corrective action script to address this situation. A trigger may be performed to run the script to perform the corrective action (e.g., the trigger causes an instruction to be sent to the agent on the customer network to run the script). In an alternative embodiment, the appropriate script for the situation is pushed down from the server to the customer network to be executed. In addition, at 136, any other additional functions and/or actions may be taken as appropriate based at last upon the processed data.

Figure 3A:
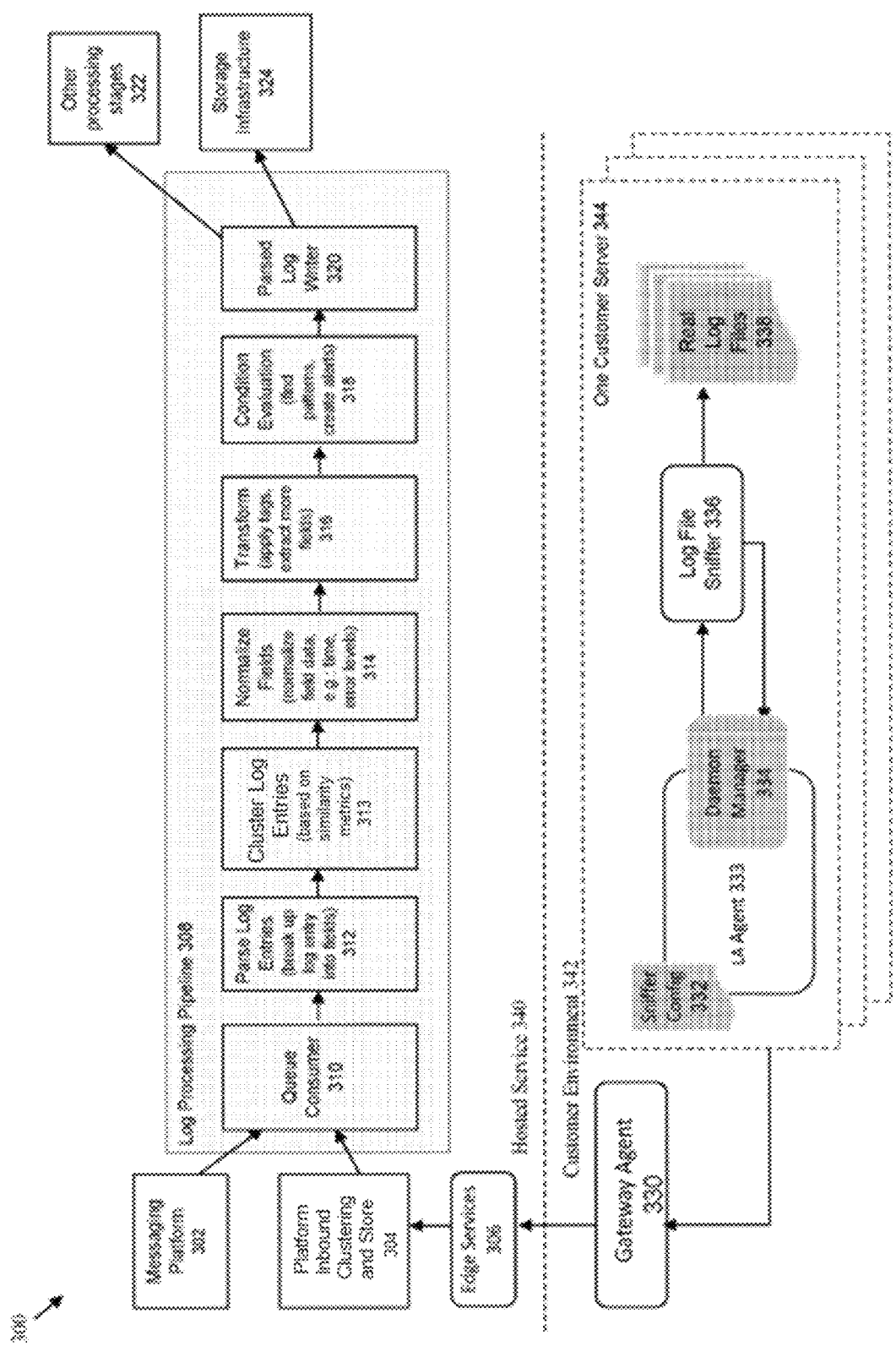
FIGS. 3A-3C are flow diagrams illustrating the internal structure of the log analytics system at a host environment.

FIG. 3A provides a more detailed illustration of the internal structure of the log analytics system at a host environment 340 and the components within the customer environment 342 that interact with the log analytics system. This architecture 300 is configured to provide a flow for log monitoring that is able to handle large amounts of log data ingest.

In the customer environment 342 within a single customer host/server 344, the LA (log analytics) agent 333 takes the log monitoring configuration data 332 (e.g., sniffer configuration or target-side configuration materials), and calls a log file 336 sniffer (also referred to herein as the "log collector") to gather log data from one or more log files 338.

A daemon manager 334 can be employed to interface with the log file sniffer 336. The log file sniffer 336 reads from one or more log files 338 on the host machine 344. The daemon manager 334 takes the log content and packages it up so that it can be handed back to the LA agent 333. It is noted that the system may include any number of different kinds of sniffers, and a log sniffer 336 is merely an example of a single type of sniffer that can be used in the system. Other types of sniffers may therefore be employed within various embodiments of the invention, e.g., sniffers to monitor registries, databases, windows event logs, etc. In addition, the log sniffer in some embodiments is configured to handle collective/compressed files, e.g., a Zip file.

The LA agent 333 sends the gathered log data to the gateway agent 330. The gateway agent 330 packages up the log data that is collected from multiple customer hosts/servers, essentially acting as an aggregator to aggregate the log content from multiple hosts. The packaged content is then sent from the gateway agent 330 to the edge services 306. The edge services 306 receive a large amount of data from multiple gateway agents 330 from any number of different customer environments 342.

Given the potentially large volume of data that may be received at the edge services 306, the data can be immediately processed to assign each log message to an initial cluster and stored into an inbound data storage device 304 (the "platform inbound clustering store"). In some instances, an initial or preliminary processing may be performed at an ingest time, which can include a time corresponding to (e.g., before, shortly or immediately after, or concurrent with) storage of the data. The initial or preliminary processing may include (for example) detecting which parts of the data are non-variable components and determining an initial cluster for each log message based on the non-variable components detected in the message. For example, a hashing technique may be applied to a value of each non-variable component to generate an identifier of the initial cluster. The log message may then be stored in association with the identifier of the initial cluster or other cluster data can be stored to indicate that the log message is associated with the initial cluster. Cluster assignments may be further refined, enhanced and/or used during subsequent processing, such as during processing that occurs during a time of subsequent resource availability and/or in response to receiving a query for data corresponding to or potentially corresponding to the associated log messages.

Thus, in some instances, a queue is managed and maintained, where queue elements corresponding to one or more log messages for which cluster assignments are to be refined, enhanced and/or used. An element may be added to the queue (for example) subsequent to an initial storing of the queue element and/or in response to receiving a query for data corresponding to or potentially corresponding to one or more associated log messages. The queue can be used for the log processing pipeline 308.

A data structure is provided to manage the items to be processed within the inbound data store. In some embodiments, a messaging platform 302 (e.g., implemented using the Kafka product) can be used to track the to-be-processed items within the queue. Within the log processing pipeline 308, a queue consumer 310 identifies the next item within the queue to be processed, which is then retrieved from the platform inbound store. The queue consumer 310 comprises any entity that is capable of processing work within the system off the queue, such as a process, thread, node, or task.

The retrieved log data undergoes a "parse" stage 312, where the log entries are parsed and broken up into specific fields or components. The "log type" configured for the log specifies how to break up the log entry into the desired fields.

At a "cluster" stage 313, log data is further analyzed to assign individual log messages to a cluster. Specifically, multiple initial clusters to which log messages were assigned during an intake process (e.g., at 304) can be assessed to determine whether some of the initial clusters are to be merged together. The assessment can include identifying one or more representative samples for each cluster and performing pair-wise quantitative comparative assessments. Cluster pairs assessed via a pair-wise comparative assessment can include clusters with log messages having same or similar number of components (or words). In some instances, each pair of clusters includes clusters associated with a number of components that are the same or different from each other by less than a threshold number (e.g., that is predefined, a default number, or identified by a user) is evaluated using the assessment. The comparative assessment may be performed iteratively and/or in a structured manner (e.g., such that pairs with a same number of components are evaluated prior to evaluating pairs with a different number of components).

The pair-wise quantitative comparative assessment can include, for example, generating a similarity metric using the representative messages and determining whether the metric exceeds a threshold metric (e.g., that is predefined, a default number of identified by a user). The similarity metric may be based on (for example) whether the representative messages include a same (or similar) number of components, number of variable (or non-variable) components, content of each of one or more non-variable components, characteristic (e.g., format, character type or length) of one or more variable components, and so on. The similarity metric may be based on generating a correlation coefficient between the inter-cluster messages or by performing a clustering technique using a larger set of messages to an extent to which representative messages of the clusters are assigned to a same cluster or share components (e.g., if a technique includes using a component analysis, such as principal component analysis or independent component analysis.

In the "normalize" stage 314, the identified fields are normalized. For example, a "time" field may be represented in any number of different ways in different logs. This time field can be normalized into a single recognizable format (e.g., UTC format). As another example, the word "error" may be represented in different ways on different systems (e.g., all upper case "ERROR", all lower case "error", first letter capitalized "Error", or abbreviation "err"). This situation may require the different word forms/types to be normalized into a single format (e.g., all lower case unabbreviated term "error").

The "transform" stage 316 can be used to synthesize new content from the log data. As an example, "tags" can be added to the log data to provide additional information about the log entries. As another example, a tag may identify a cluster to which a log message is assigned.

A "condition evaluation" stage 318 is used to evaluate for specified conditions upon the log data. This stage can be performed to identify patterns within the log data, and to create/identify alerts conditions within the logs. Any type of notifications may be performed at this stage, including for example, emails/text messages/call sent to administrators/customers or alert to another system or mechanism. As one example, a condition may define an event that corresponds to a change in cluster assignments, such as detecting that a quantity (e.g., number or percentage) of log messages assigned to a given cluster has exceeded a threshold (e.g., that is fixe and pre-defined or defined by a user, a client or rule), such as being below a lower threshold or above an upper threshold. As another example, a condition may define an event that corresponds to a degree to which a quantity of log messages being assigned to a given threshold is changing, such as by identifying a threshold for a slope of a time series or a threshold for a difference in counts or percentages or log message assigned to the cluster between two time bins. As yet another example, a condition may define an event that corresponds to multiple cluster assignments, such as an event that indicates that a time series of each of the multiple clusters has a similar shape (e.g., by determining whether curve-fit coefficients are similar enough to be within a threshold amount, by determining whether a time of one or more peaks in time series are within a defined threshold time, determining whether a correlation coefficient between time series of the clusters exceeds a threshold, and/or determining whether a difference between a variability of a time series of each of the individual clusters and a variability of a sum of the time series exceeds a threshold value).

A log writer 320 then writes the processed log data to one or more data stores 324. In some embodiments, the processed data is stored within both a text/indexed data store (e.g., as a SOLR cluster) and a raw and/or historical data store (e.g., as a HDFS cluster). The log writer can also send the log data to another processing stage 322 and/or downstream processing engine.

Figure 3B:
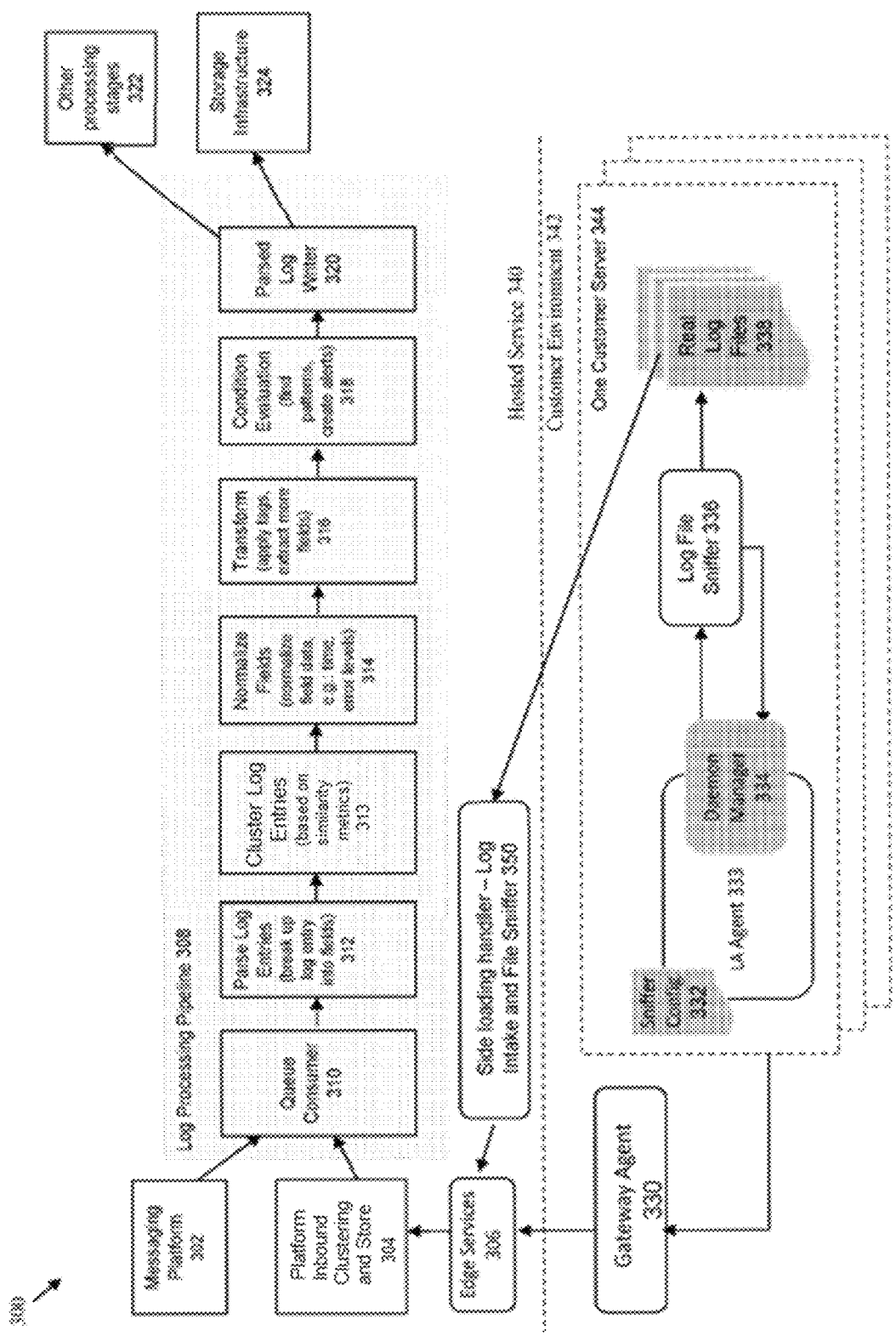
Figure 3C:
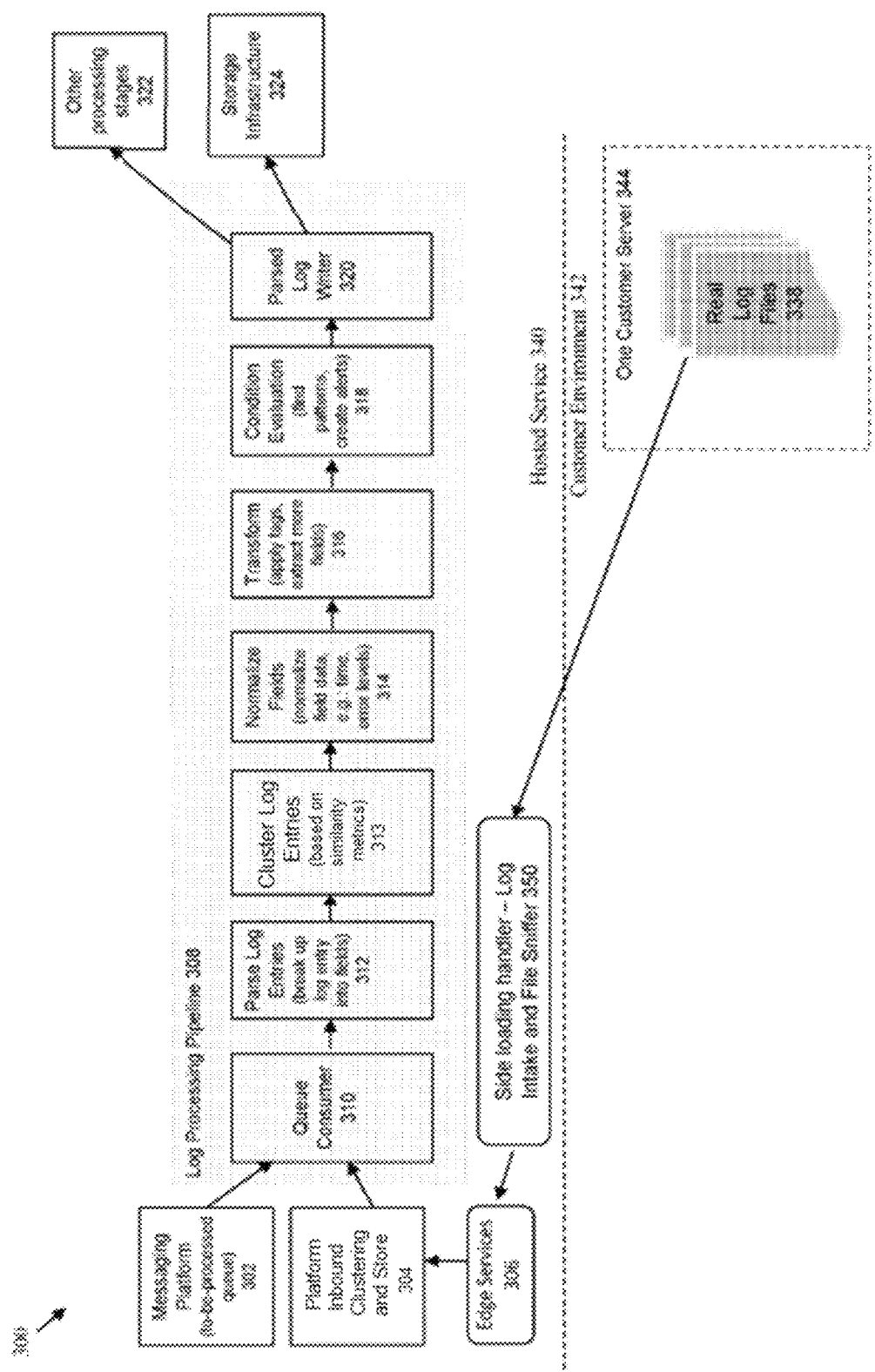

As shown in FIG. 3B, some embodiments provide a side loading mechanism 350 to collect log data without needing to proceed through an agent 333 on the client side. In this approach, the user logs into the server to select one or more files on a local system. The system will load that file at the server, and will sniff through that file (e.g., by having the user provide the log type, attempting likely log types, rolling through different log types, or by making an educated "guess" of the log type). The sniffing results are then passed to the Edge Services and process as previously described. In the embodiment, of FIG. 3C, only the side loading mechanism 350 exists to gather the log files—where the agent/sniffer entities are either not installed and/or not needed on the client server 344.

Figure 4:
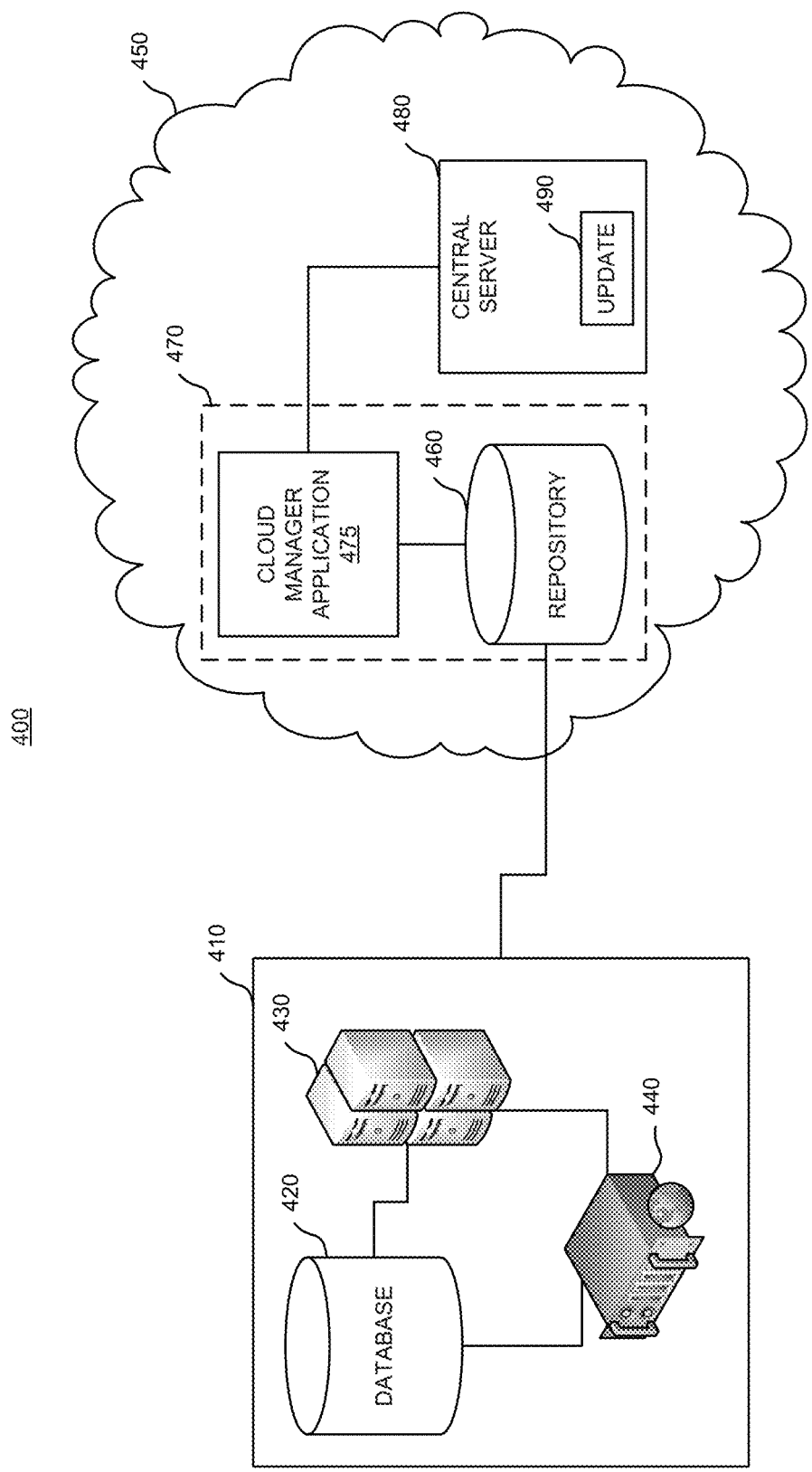
FIG. 4 is a block diagram illustrating an example network environment.

FIG. 4 shows an example network environment 400 for exporting on-premises applications to cloud systems. Network environment 400 can include local system 410 and cloud system 450. Local system 410 can include one or more internal subsystems, such as databases 420, applications servers 430, and web servers 440. Each of the internal subsystems of local system 410 may not be included in a cloud system. In some implementations, the physical components of the databases 420, application servers 430, and the web servers 440 may be on-premises at a facility associated with a company. Each of databases 420, application servers 430, and web servers 440 can, at least in part, execute one or more applications.

It will be appreciated that while the term "on-premises" is used to refer to systems being located at a facility of the company, the present disclosure is not limited thereto. For example, local system 410 and its internal subsystems may or may not be physically on-premises at a facility of the company, but rather, the internal subsystems can be distributed across areas that are not affiliated with the company (e.g., rented servers). In addition, local system 410 can be used to run the one or more applications that are managed by the company.

In some implementations, cloud system 450 can include repository 460, cloud manager 470, cloud manager application stack 475, and central server 480. Updates to multi-tier application stacks may be periodically stored in central server 480. For example, update 490 may include code that updates one or more applications. Non-limiting examples of update 490 may include bug fixes, added features to an application, added functionality to the application, modified features, modified functionality, deleted features, and/or deleted functionality. Update 490 may be defined (e.g., the code was written) by one or more programmers or, in some cases, update 490 may be automatically created based on one or more rules and/or machine-learning techniques. As new updates are periodically defined, the updates may be stored at central server 480 as update 490. Central server 480 can store multiple updates for various applications. Repository 460 can include one or more storage systems for storing the deployment packages of incoming applications that are being exported from local systems to cloud system 450. For example, a deployment package may be serialized version of an application that is exportable across systems. Cloud manager 470 can be one or more applications, systems or engines that are configured to manage one or more aspects of cloud manager application stack 475. For example, a cloud manager administrator can operate or access cloud manager 470 to run a cloud manager application using the cloud manager application stack 475. Cloud manager 470 may be an application that provides deployment of environments in cloud system 450. For example, cloud manager 470 can deploy various applications on cloud system 450 in an automated manner. For additional details on the Cloud Manager application, see U.S. Ser. No. 62/507,086, filed May 16, 2017, entitled "Distributed Versioning of Applications Using Cloud-Based Systems," the disclosure of which is incorporated by reference herein in its entirety for all purposes.

In some examples, the network administrators of local system 410 may need to export their enterprise applications to the cloud (e.g., to increase scalability of the enterprise application). Embodiments of the present disclosure enable the network administrators of the local system to export their enterprise applications from the internal subsystems to the cloud system 450. In some examples, during the life cycle of an application, application administrators may migrate their on-premises applications to cloud system 470. During the migration process, application administrators can export the on-premises environment using deployment packages and import the deployment packages to cloud system 450. Cloud manager 470 can read the deployment packages of the enterprise application and deploy the application on cloud system 450.

It will be appreciated that a new feature set or a new image can be published, available at, or stored at a central server. The new feature set or the new image can include all the new features of the latest version of the application. That new feature set or new image can be compared with an outdated version of the application, and the new features set or new image can be moved to the outdated version of the application in an automated, one-step process. For instance, with a single input from the user, the new feature set or new image can be applied to the outdated version of the application.

It will also be appreciated that cloud system 450 may be implemented as a metadata-driven architecture. For example, software components, java code, python code, any other suitable source code may individually be represented as a database object within a runtime environment. Continuing with this example, a software component included in the source code underlying an application may be referred to as a file reference object. Each file reference object may be associated with metadata that is stored in a metadata table. For instance, the metadata of a file reference object may include an internal version identifier of the file reference object. The internal version number may be a unique identifier that uniquely identifies the file reference object and/or the version of the file reference object. If a new version of the file reference object is created (e.g., if the file reference object is modified or updated), then the new version of the file reference object may be associated with a new internal version number. In some implementations, the file reference object may be represented as a binary object and a reference of that binary object (e.g., a unique identifier) may be stored in a database to associated the reference with the binary object and/or a network location of the binary object.

In some implementations, a block of code may correspond to, be referred to as, or may be a database object. The database object may correspond to an internal unique identifier and/or additional internal metadata that describes attributes of the database object. For example, attributes of the database object that are stored as metadata associated with the database object may include how the block of code is executed, how the block of code or the database object is represented at runtime, and the like. It will be appreciated that the present disclosure is not limited to file reference objects and database objects; instead any type of object may be used in the embodiments of the present disclosure.

Additionally, when an object (e.g., a database object) is created, a version of the object is generated and metadata defining or describing attributes of the object are stored in a development table or a representation table. For example, by querying the metadata stored in the representation tables for two objects, the application and/or the change assistant tool may be configured to identify the difference(s) and/or similarities between the two objects. As a non-limiting example, the application and/or the change assistant tool may be configured to compare a target (e.g., the currently running instance of the application) with a source (e.g., the new instance of the application) to identify the differences between the target and the source. The result of the comparison may be a determination that the source includes file reference object ABC, version 12 (associated with unique identifier ABC12), whereas, the target includes file reference object ABC, version 11 (associated with unique identifier ABC11). Accordingly, the application can access a representation table that stores the metadata associated with each of unique identifiers ABC12 and ABC11. The application can then serialize the file reference object associated with identifier ABC12 into an update data package, and apply (e.g., install) that update data package to the current running instance so that the file reference object ABC version 11 of the currently running instance can be updated to version 12. In some implementations, any other metadata that is different between ABC12 and ABC11 can be identified and installed in the currently running instance so as to update the currently running instance to include all of the updates installed in the new instance. Additionally, the update data package may be a file that is exportable between systems. The update data package enables the features of metadata stored in the representation table to be exported to the currently running instance, instead of exporting the entirety of the new instance to the currently running instance. Advantageously, the exportation of updated objects only improves network resource usage by reducing the size of the export file that is transmitted or moved to the currently running instance.

Figure 5:
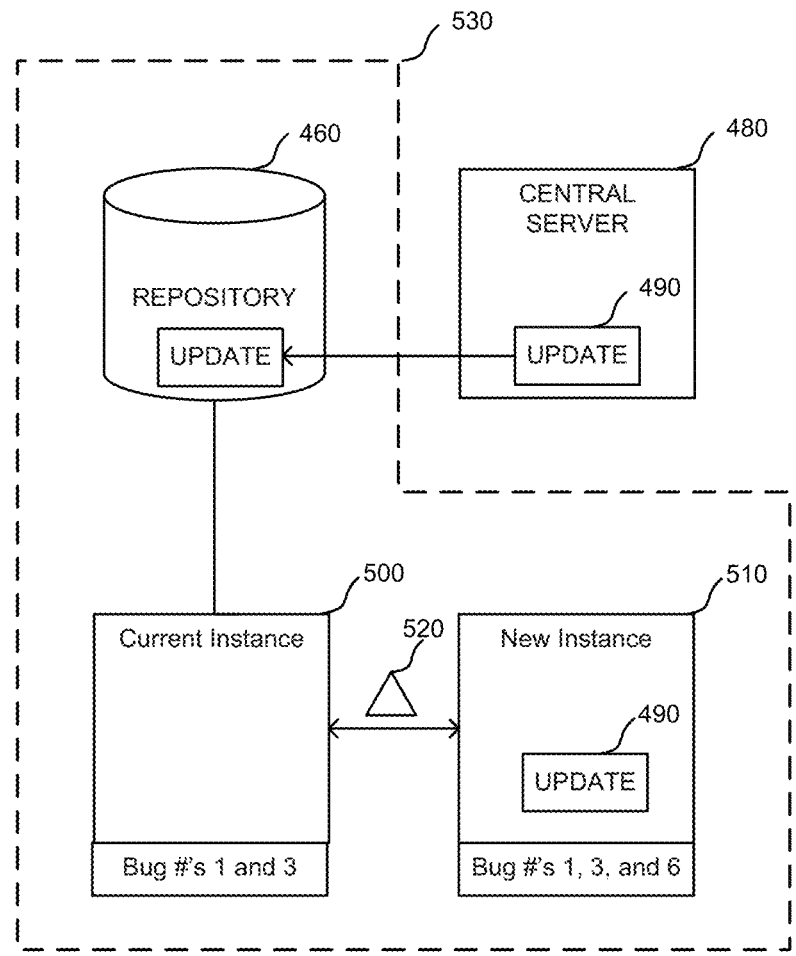
FIG. 5 is a block diagram illustrating a process flow for automatically updating a multi-tier application stack.

FIG. 5 is a block diagram illustrating a process flow for automatically updating a multi-tier application stack. Periodically updates to a multi-tier application stack can be stored in central server 480. Application environment 530 can include a repository 460 that is configured to retrieve and store the updates (e.g., update 490) from central server 480. Non-limiting examples of an update may include update images and patchsets. For example, an update image (e.g., a major application update that issues approximately once a quarter) may be one or more data packages that include all bug fixes and new features of a particular version of the application. A patchset (e.g., a minor application update, e.g., to fix bugs, that issues between the major application updates) may be one or more data packages that contain individual bug fixes that were reported since the last update image was released. Whenever an update image is released, the source files of the update image may be stored in central server 480. For example, in FIG. 5, central server 480 can store update 490 as an update image or a patchset. Central server 480 is accessible to all application stacks in the cloud system 450, and thus, central server 480 can store any number of updates for any number of application stacks. Referring to FIG. 5, update 490 may be an update for a particular multi-tier application stack.

Figure 6:
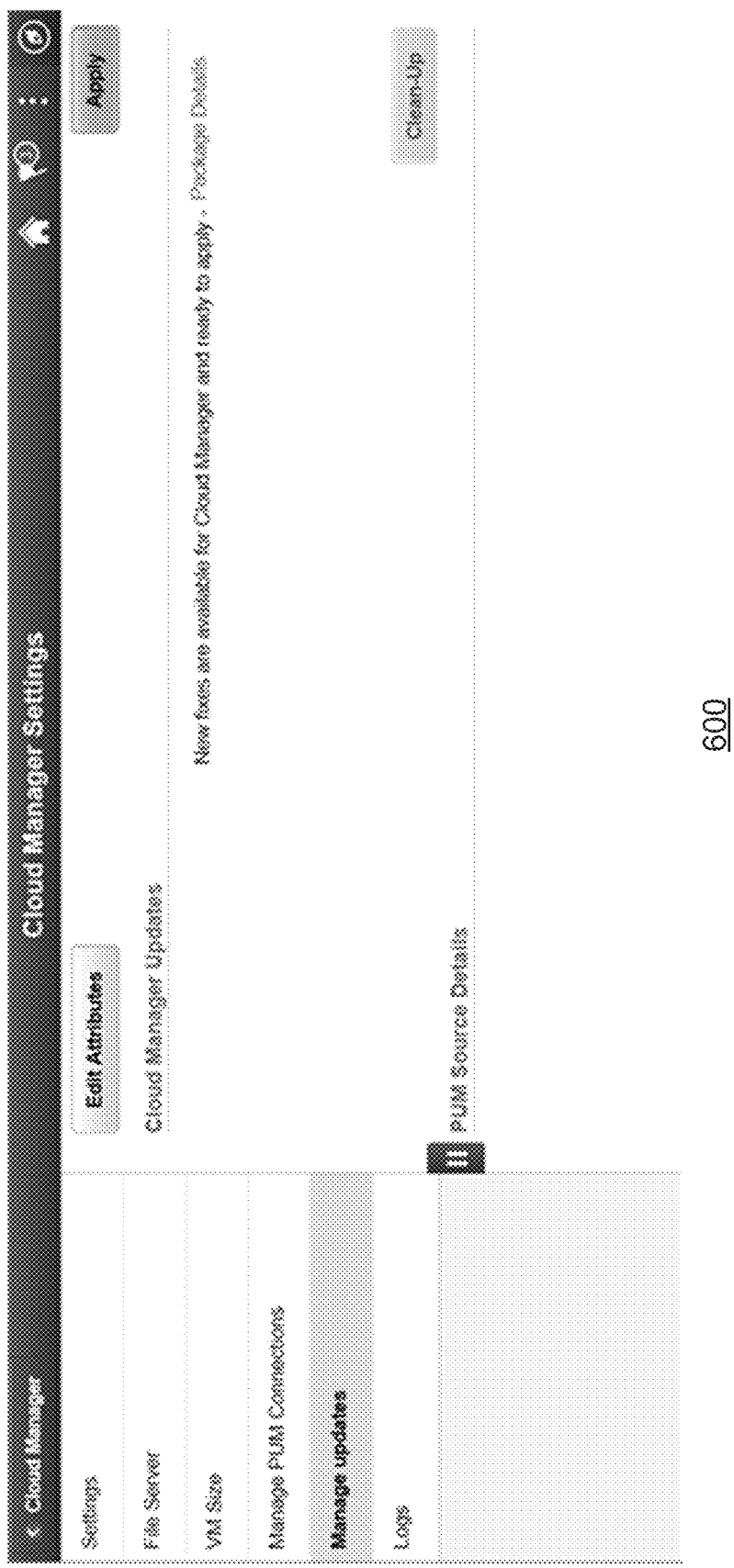

In some implementations, the application stack associated with update 490 may be configured to periodically (at a regular or irregular interval) query central server 480 for updates. In some implementations, central server 480 may transmit a notification to one or more application stacks. The notification may serve to notify a user of the application or the application itself that update 490, for example, is currently available for downloading from central server 480. FIG. 6 illustrates an example interface that shows a notification that a new update is available in central server 480. When a new update is available in central server 480, a version of the currently running instance of the application stack may be outdated. Certain embodiments of the present invention enable the application to automatically update itself to the latest version when new updates are available in central server 480.

In some embodiments, repository 460 can store the updates retrieved from central server 480. For example, repository 460 can query central server 480 for any updates and, if available, update 490 can be downloaded to repository 460. Further, application environment 530 can include a currently running instance 500 associated with the multi-tier application stack. For example, currently running instance 500 may be executed in application environment 530 and may run on an application stack in a production environment. For example, real user devices may be communicating with the currently running instance 500 in the production environment to enable the application to provide a service to users. Because the application is running in a production environment, any server downtime for updates has a negative impact because users may not be able to access the application and its corresponding services. Advantageously, and as a technical point of novelty, embodiments of the present invention enable the application to be updated with minimal server downtime, regardless of the size of the update (e.g., 1 bug fix or 10,000 bug fixes).

As described above, current instance 500 may be an outdated version of the application. For example, current instance 500 may be a version of the application that does not include update 490. To update current instance 500 with update 490, application environment 530 can generate new instance 510. Each of the current instance 500 and new instance 510 may run on the same or different virtual machine with predefined configuration settings (e.g., CPU parameters, RAM allocation, and so on). Further, application environment 530 may be configured to install update 490 in new instance 510. Accordingly, new instance 510 may be the latest version of the application (e.g., the version of the application with update 490 installed and available to users).

Application environment 530 can be configured to compare current instance 500 with new instance 510 to identify whether there is any delta 520 (e.g., differences) between the current instance 500 and the new instance 510. In some embodiments, comparing current instance 500 and new instance 510 to identify delta 520 may include comparing the bug numbers associated with each instance. For example, a bug number may be a unique identifier that identifies a particular bug report that corresponds to one or more bugs that were fixed (or the source code was modified to address a bug) within the application's source code. For example, the bug numbers of an instance may be stored as metadata associated with the instance. In this example, metadata for current instance 500 may store data indicating that bug numbers 1 and 3 were previously fixed or applied to current instance 500. Further, metadata for new instance 510 may store data indicating that bug numbers 1, 3, and 6 were applied to new instance 510. In this example, bug numbers 1 and 3 would already have been applied to new instance 510 since new instance 510 is a newly spawned instance of current instance 500, and thus, bug number 6 would be detected as the update. For instance, application environment 530 can compare the metadata of current instance 500 with the metadata of new instance 510 to determine that delta 520 between these two instances is bug number 6.

Accordingly, in a situation where update 490 is the next version or iteration of the application after the version of the application running in current instance 500, then update 490 would correspond to bug number 6, indicating that update 490 fixes one or more bugs associated with bug number 6. When application environment 530 identifies that delta 520 corresponds to bug number 6, application environment 530 can access the one or more objects associated with the bugs addressed by the bug report of bug number 6. Application environment 530 can export the one or more objects and incorporate the bug fixes associated with bug number 6 into the source code of application environment 530. Since a bug may be fixed in a particular software component that runs on a web server, application server, and/or database server, the one or more objects may be applied to the relevant software components (e.g., if the bug was fixed in the software components of the web server, the one or more objects would be applied to the software components of the web server associated with current instance 500). Advantageously, the current instance 500, which is running in the production environment and accessible to users, can be automatically updated with minimal downtime.

It will be appreciated that when the comparison is performed, the current instance 500 can still be providing services to users (e.g., no downtime of the servers). When the application stack is being updated based on delta 520, then application environment 530 may initiate a lock, which prevents transactions during a defined period of time. During the lock, the current instance 500 can be updated with the one or more objects associated with delta 520. After the current instance 500 is updated, then the current instance 500 may be rebooted, and the lock may be released so that the update 490 may be available or incorporated in current instance 500.

It will be appreciated that when a new version of an application is released, a new image of the application is published to the central server (e.g., the update is stored at the central server). The new image includes all of the features of the new version of the application. The application may be configured to provision a new instance of the application with the features of the new version. A change assistant tool can be configured to compare metadata of the new instance with the currently running instance of the application, which will be a more outdated version of the application than the new version. The application can then install the metadata of the updated source code or the updated binary code, which may include both database objects plus the binary runtime. Further, the metadata of the updated source code can be moved to the currently running instance in a serialized form as an update data package and installed or applied to the currently running instance.

FIGS. 6-8 illustrate example interfaces presented on a user device when a user accesses the application that runs on the multi-tier application stack. For example, interface 600 presents a notification that "New fixes are available for Cloud Manager and ready to apply." In some implementations, interface 600 may be presented on a user device when a user accesses the application's settings configuration page. As non-limiting examples, several configurations can be defined on the settings configurations page, such as file server configurations, virtual machine configurations, and update management configurations. While interface 600 can present a notification when new updates are stored and available in the central server (e.g., central server 480), in some embodiments, the new updates available in the central server are automatically downloaded and applied to the application, and thus, no notification would be necessary. In some embodiments, a user may be notified after an available update is downloaded from the central server and installed in the currently running instance (e.g., after the comparison is performed and the deltas are determined). FIG. 7 is an example interface illustrating the updates that are available (e.g., stored at) the central server (e.g., central server 480). As can be seen from interface 700, an example of an update can be a bug number that represents one or more bugs that were fixed as part of the update. To illustrate, item number 10 shown in interface 700 corresponds to bug number 22093199. The description of bug number 22093199 is "Ok button not being displayed when using the design form wizard." In this illustration, bug number 22093199 is configured to fix an error in the application—and specifically, the error of the "OK" button not being displayed in a design form wizard. In this example, the currently running instance would not have had bug number 22093199 installed yet, and thus, the currently running instance would be an outdated version of the application. The bug fix corresponding to bug number 22093199 would, however, be installed on the new instance of the application. Comparing the metadata of the currently running instance with the metadata of the new instance would result in bug number 2209199 being identified as a bug number that has not yet been applied to the currently running instance. In some embodiments, some or all of the available updates stored in the central server are automatically downloaded to the repository associated with the application (e.g., repository 460). In some embodiments, interface 700 enables a user to select which updates the user wants to apply to the currently running instance of the application. In some embodiments, the updates associated with the currently running instance would be automatically applied to the currently running instance without needing to receive input or instructions from a user. In these embodiments, the currently running instance is always running at the most-up-to-date version.

FIG. 8 is an example interface 800 illustrating the exemplary steps that are performed to automatically update the currently running instance of the application. A status of each step can be individually presented on interface 800. Step 1 may include creating a new environment template, in which a new instance of the application can be deployed. Step 2 may include deploying the new instance in the new environment template. Step 3 includes installing a "change assistant," which is a tool that compares a source database (e.g., the new instance which will have the update installed) with a target database (e.g., the currently running instance without the update installed). At step 4, the update (e.g., a patchset, which can include a bug fix within source code) can be applied to the source database (e.g., the new instance now with the update installed). At step 5, an update data package can be defined (e.g., a "make me current" change package). The update data package may include identifiers of objects that are different between the source database and the target database. For instance, the identifiers of objects that are different between the source database and the target database may represent the update that was installed on the source database. In some examples, once the differences between the source database and the target database are identified, the change assistant can generate the update data package, which includes all of the objects that were changed by the update. If an object is different between the source database and the target database, that object may represented by a unique identifier. Once identified, that object can be downloaded to a file, and then exported in a serialized form. At step 6, the update data package is created (e.g., the data packing including the identifiers of the objects that were detected as having been changed between the source database and the target database). At step 7, the update data package can be applied to the target database, so that the files of the target database can be updated and brought to the most up-to-date version of the application.

Figure 9:
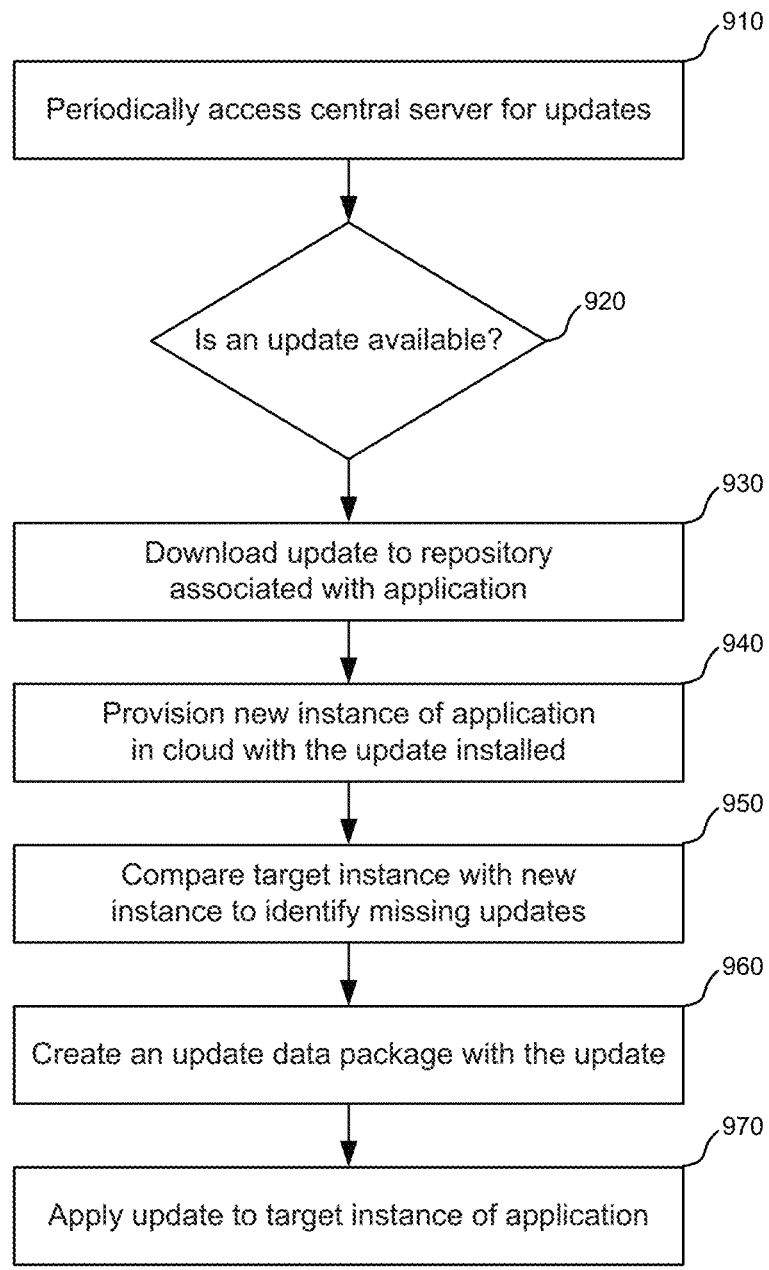
FIG. 9 is a flowchart illustrating a process for creating templates.

FIG. 9 is a flowchart illustrating an example process 900 for automatically updating a multi-tier application. As described above, major releases can be available periodically on a regular or irregular basis, and minor releases can be available periodically between the major releases. For example, between the major releases, minor updates may be available to fix bugs found in the major releases. Certain embodiments enable an application stack to be updated automatically with minimal downtime and minimal network burden, regardless of whether the most recent update was a major release or a minor update.

Process flow 900 begins at block 910, where the application periodically accesses a central server to determine whether an update is stored at the central server. For example, the application can be configured to randomly or regularly query the central server for any new updates that are available or stored at the central server. At block 920, the application can determine if an update is available. If no updates are available, then the application continues to query the central server for updates at another time. However, if one or more updates are stored at the central server, then the one or more updates can be downloaded to a repository associated with the application, as in block 930. Once the update is downloaded from the central server to the repository, the update can be deleted from the central server or flagged as having been downloaded. At block 940, the application environment can then provision a new instance of itself in the cloud and install the one or more updates in the new instance. For example, provisioning a new instance can include generating a new virtual machine with pre-defined or defined-on-the-fly configuration settings (e.g., CPU and RAM allocations), and running the application stack on the new virtual machine with the one or more updates installed. At this time, the application environment can be associated with both a currently running instance of the application (e.g., the instance of the application that is currently interacting with users) and the new instance of the application, which has the downloaded updates installed. However, in some implementations, the currently running instance is in a production environment, whereas, the new instance of the application in not in a production environment. In these implementations, end users cannot communicate with the new instance of the application and/or the new instance of the application does not process transactions based on interactions between the new instance and end user devices. Instead, the end users continue to communicate with the currently running instance.

At block 950, the application compares the currently running instance with the new instance to determine if there are any differences (e.g., a delta) between the two instances. For example, and as described above, comparing the two instances can include comparing the metadata of the currently running instance against the metadata of the new instance. In some implementations, the metadata can include the bug numbers that have been or were previously applied to the source code of the instance. If the set of bug numbers included in the metadata of the new instance are different from the set of bug numbers included in the metadata of the current instance, then the application can determine that the update corresponds to the difference (e.g., delta) in bug numbers. For example, bug numbers 1 and 3 were previously applied to the current instance, and if bug numbers 1, 3, and 5 were previously applied to the new instance, the delta of bug number 5 is determined to be applied to the current instance to update the current instance to the latest version of the application. It will be appreciated that the metadata may include data other than bug numbers. For example, identifiers of file reference objects and/or the file reference objects, which represent modified source code, can be stored as metadata. In this example, comparing metadata of the new instance with metadata of the current instance can identify the file reference objects, which were modified by the update installed in the new instance. At block 960, the application can create an update data package that includes the delta between the metadata of the current instance and the metadata of the new instance. At block 970, the current instance can apply the data package to itself, which in effect, updates the current instance. Advantageously, the update to the current instance minimally interrupts the service provided by the application and improves network efficiency.

Figure 10:
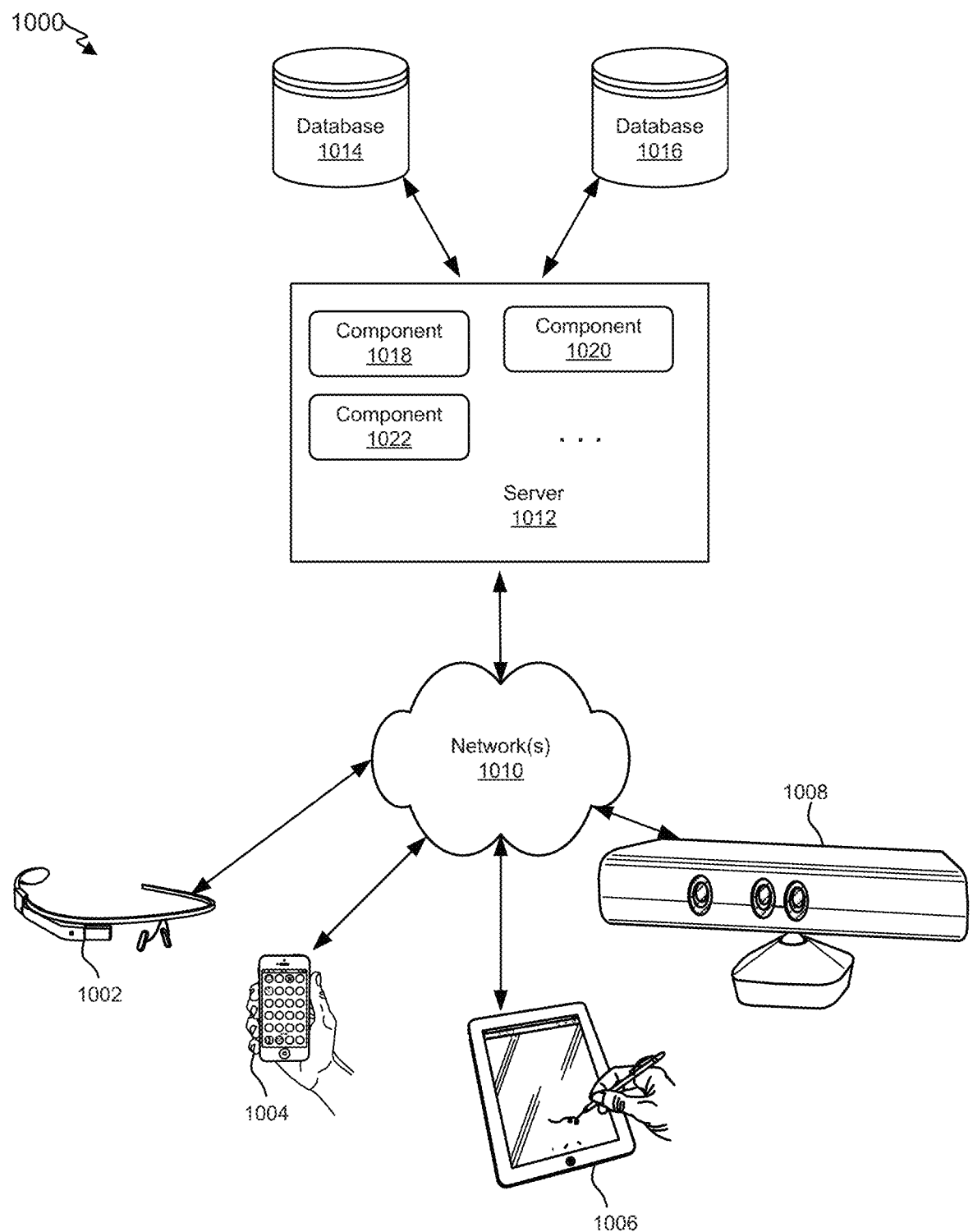
FIG. 10 is a simplified diagram illustrating a distributed system for implementing one of the embodiments.

FIG. 10 depicts a simplified diagram of a distributed system 1000 for implementing one of the embodiments. In the illustrated embodiment, distributed system 1000 includes one or more client computing devices 1002, 1004, 1006, and 1008, which are configured to execute and operate a client application such as a web browser, proprietary client (e.g., Oracle Forms), or the like over one or more network(s) 1010. Server 1012 may be communicatively coupled with remote client computing devices 1002, 1004, 1006, and 1008 via network 1010.

In various embodiments, server 1012 may be adapted to run one or more services or software applications provided by one or more of the components of the system. In some embodiments, these services may be offered as web-based or cloud services or under a Software as a Service (SaaS) model to the users of client computing devices 1002, 1004, 1006, and/or 1008. Users operating client computing devices 1002, 1004, 1006, and/or 1008 may in turn utilize one or more client applications to interact with server 1012 to utilize the services provided by these components.

In the configuration depicted in the figure, the software components 1018, 1020 and 1022 of system 1000 are shown as being implemented on server 1012. In other embodiments, one or more of the components of system 1000 and/or the services provided by these components may also be implemented by one or more of the client computing devices 1002, 1004, 1006, and/or 1008. Users operating the client computing devices may then utilize one or more client applications to use the services provided by these components. These components may be implemented in hardware, firmware, software, or combinations thereof. It should be appreciated that various different system configurations are possible, which may be different from distributed system 1000. The embodiment shown in the figure is thus one example of a distributed system for implementing an embodiment system and is not intended to be limiting.

Client computing devices 1002, 1004, 1006, and/or 1008 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1002, 1004, 1006, and 1008 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1010.

Although exemplary distributed system 1000 is shown with four client computing devices, any number of client computing devices may be supported. Other devices, such as devices with sensors, etc., may interact with server 1012.

Network(s) 1010 in distributed system 1000 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1010 can be a local area network (LAN), such as one based on Ethernet, Token-Ring and/or the like. Network(s) 1010 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1012 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1012 may be adapted to run one or more services or software applications described in the foregoing disclosure. For example, server 1012 may correspond to a server for performing processing described above according to an embodiment of the present disclosure.

Server 1012 may run an operating system including any of those discussed above, as well as any commercially available server operating system. Server 1012 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1012 may include one or more applications to analyze and consolidate data feeds and/or event updates received from users of client computing devices 1002, 1004, 1006, and 1008. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1012 may also include one or more applications to display the data feeds and/or real-time events via one or more display devices of client computing devices 1002, 1004, 1006, and 1008.

Distributed system 1000 may also include one or more databases 1014 and 1016. Databases 1014 and 1016 may reside in a variety of locations. By way of example, one or more of databases 1014 and 1016 may reside on a non-transitory storage medium local to (and/or resident in) server 1012. Alternatively, databases 1014 and 1016 may be remote from server 1012 and in communication with server 1012 via a network-based or dedicated connection. In one set of embodiments, databases 1014 and 1016 may reside in a storage-area network (SAN). Similarly, any necessary files for performing the functions attributed to server 1012 may be stored locally on server 1012 and/or remotely, as appropriate. In one set of embodiments, databases 1014 and 1016 may include relational databases, such as databases provided by Oracle, that are adapted to store, update, and retrieve data in response to SQL-formatted commands.

Figure 11:
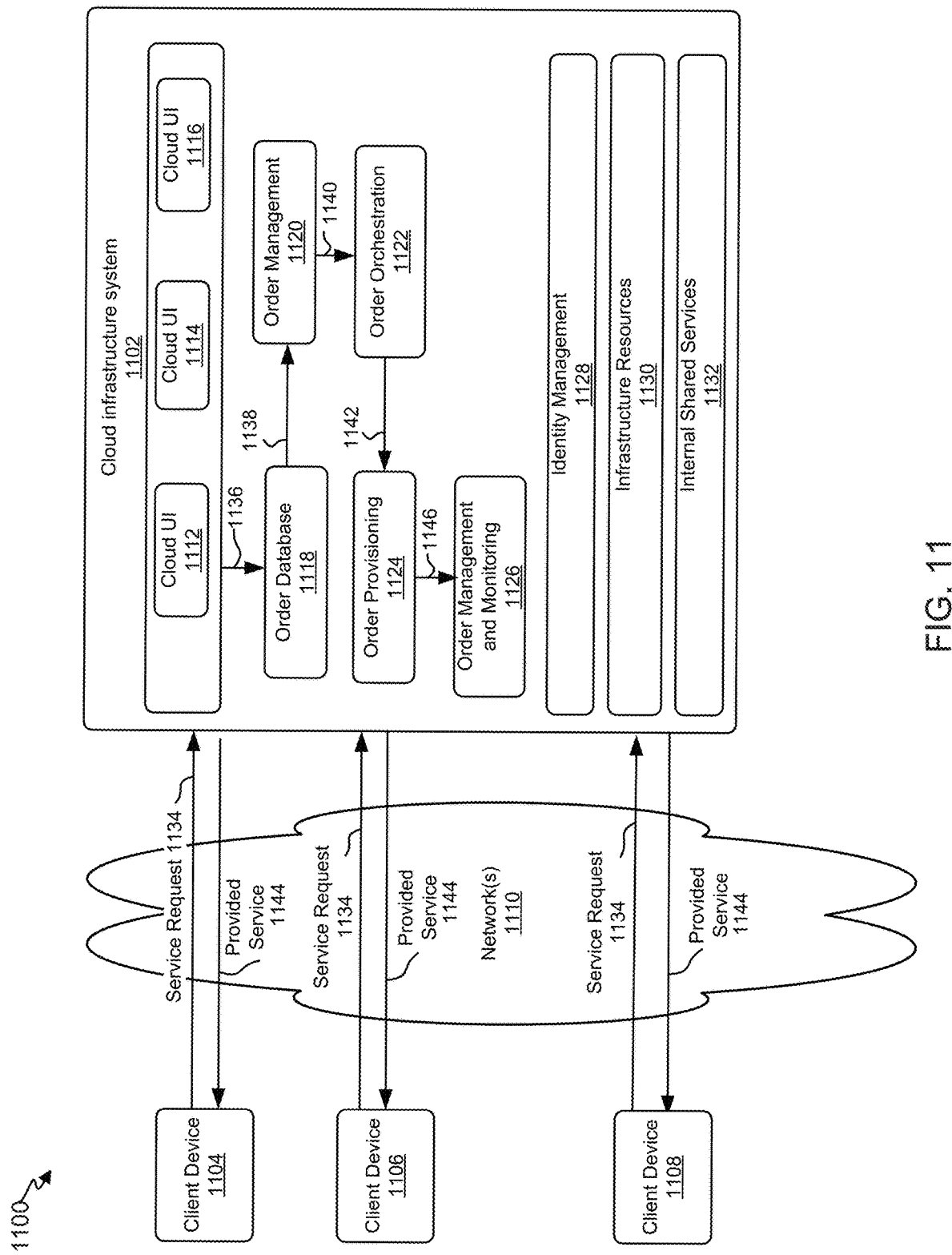
FIG. 11 is a simplified block diagram illustrating one or more components of a system environment.

FIG. 11 is a simplified block diagram of one or more components of a system environment 1100 by which services provided by one or more components of an embodiment system may be offered as cloud services, in accordance with an embodiment of the present disclosure. In the illustrated embodiment, system environment 1100 includes one or more client computing devices 1104, 1106, and 1108 that may be used by users to interact with a cloud infrastructure system 1102 that provides cloud services. The client computing devices may be configured to operate a client application such as a web browser, a proprietary client application (e.g., Oracle Forms), or some other application, which may be used by a user of the client computing device to interact with cloud infrastructure system 1102 to use services provided by cloud infrastructure system 1102.

It should be appreciated that cloud infrastructure system 1102 depicted in the figure may have other components than those depicted. Further, the embodiment shown in the figure is only one example of a cloud infrastructure system that may incorporate an embodiment of the invention. In some other embodiments, cloud infrastructure system 1102 may have more or fewer components than shown in the figure, may combine two or more components, or may have a different configuration or arrangement of components.

Client computing devices 1104, 1106, and 1108 may be devices similar to those described above for 1002, 1004, 1006, and 1008.

Although exemplary system environment 1100 is shown with three client computing devices, any number of client computing devices may be supported. Other devices such as devices with sensors, etc. may interact with cloud infrastructure system 1102.

Network(s) 1110 may facilitate communications and exchange of data between clients 1104, 1106, and 1108 and cloud infrastructure system 1102. Each network may be any type of network familiar to those skilled in the art that can support data communications using any of a variety of commercially-available protocols, including those described above for network(s) 1010.

Cloud infrastructure system 1102 may comprise one or more computers and/or servers that may include those described above for server 1012.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1102 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1102 may be adapted to automatically provision, manage and track a customer's subscription to services offered by cloud infrastructure system 1102. Cloud infrastructure system 1102 may provide the cloud services via different deployment models. For example, services may be provided under a public cloud model in which cloud infrastructure system 1102 is owned by an organization selling cloud services (e.g., owned by Oracle) and the services are made available to the general public or different industry enterprises. As another example, services may be provided under a private cloud model in which cloud infrastructure system 1102 is operated solely for a single organization and may provide services for one or more entities within the organization. The cloud services may also be provided under a community cloud model in which cloud infrastructure system 1102 and the services provided by cloud infrastructure system 1102 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1102. Cloud infrastructure system 1102 then performs processing to provide the services in the customer's subscription order.

In some embodiments, the services provided by cloud infrastructure system 1102 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1102 may also include infrastructure resources 1130 for providing the resources used to provide various services to customers of the cloud infrastructure system. In one embodiment, infrastructure resources 1130 may include pre-integrated and optimized combinations of hardware, such as servers, storage, and networking resources to execute the services provided by the PaaS platform and the SaaS platform.

In some embodiments, resources in cloud infrastructure system 1102 may be shared by multiple users and dynamically re-allocated per demand. Additionally, resources may be allocated to users in different time zones. For example, cloud infrastructure system 1130 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1132 may be provided that are shared by different components or modules of cloud infrastructure system 1102 and by the services provided by cloud infrastructure system 1102. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1102 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1102, and the like.

In one embodiment, as depicted in the figure, cloud management functionality may be provided by one or more modules, such as an order management module 1120, an order orchestration module 1122, an order provisioning module 1124, an order management and monitoring module 1126, and an identity management module 1128. These modules may include or be provided using one or more computers and/or servers, which may be general purpose computers, specialized server computers, server farms, server clusters, or any other appropriate arrangement and/or combination.

In exemplary operation 1134, a customer using a client device, such as client device 1104, 1106 or 1108, may interact with cloud infrastructure system 1102 by requesting one or more services provided by cloud infrastructure system 1102 and placing an order for a subscription for one or more services offered by cloud infrastructure system 1102. In certain embodiments, the customer may access a cloud User Interface (UI), cloud UI 1112, cloud UI 1114 and/or cloud UI 1116 and place a subscription order via these UIs. The order information received by cloud infrastructure system 802 in response to the customer placing an order may include information identifying the customer and one or more services offered by the cloud infrastructure system 1102 that the customer intends to subscribe to.

After an order has been placed by the customer, the order information is received via the cloud UIs, 1112, 1114 and/or 1116.

At operation 1136, the order is stored in order database 1118. Order database 1118 can be one of several databases operated by cloud infrastructure system 1118 and operated in conjunction with other system elements.

At operation 1138, the order information is forwarded to an order management module 1120. In some instances, order management module 1120 may be configured to perform billing and accounting functions related to the order, such as verifying the order, and upon verification, booking the order.

At operation 1140, information regarding the order is communicated to an order orchestration module 1122. Order orchestration module 1122 may utilize the order information to orchestrate the provisioning of services and resources for the order placed by the customer. In some instances, order orchestration module 1122 may orchestrate the provisioning of resources to support the subscribed services using the services of order provisioning module 1124.

In certain embodiments, order orchestration module 1122 enables the management of business processes associated with each order and applies business logic to determine whether an order should proceed to provisioning. At operation 1142, upon receiving an order for a new subscription, order orchestration module 1122 sends a request to order provisioning module 1124 to allocate resources and configure those resources needed to fulfill the subscription order. Order provisioning module 1124 enables the allocation of resources for the services ordered by the customer. Order provisioning module 1124 provides a level of abstraction between the cloud services provided by cloud infrastructure system 1100 and the physical implementation layer that is used to provision the resources for providing the requested services. Order orchestration module 1122 may thus be isolated from implementation details, such as whether or not services and resources are actually provisioned on the fly or pre-provisioned and only allocated/assigned upon request.

At operation 1144, once the services and resources are provisioned, a notification of the provided service may be sent to customers on client devices 1104, 1106 and/or 1108 by order provisioning module 1124 of cloud infrastructure system 1102.

At operation 1146, the customer's subscription order may be managed and tracked by an order management and monitoring module 1126. In some instances, order management and monitoring module 1126 may be configured to collect usage statistics for the services in the subscription order, such as the amount of storage used, the amount data transferred, the number of users, and the amount of system up time and system down time.

In certain embodiments, cloud infrastructure system 1100 may include an identity management module 1128. Identity management module 1128 may be configured to provide identity services, such as access management and authorization services in cloud infrastructure system 1100. In some embodiments, identity management module 1128 may control information about customers who wish to utilize the services provided by cloud infrastructure system 1102. Such information can include information that authenticates the identities of such customers and information that describes which actions those customers are authorized to perform relative to various system resources (e.g., files, directories, applications, communication ports, memory segments, etc.) Identity management module 1128 may also include the management of descriptive information about each customer and about how and by whom that descriptive information can be accessed and modified.

Figure 12:
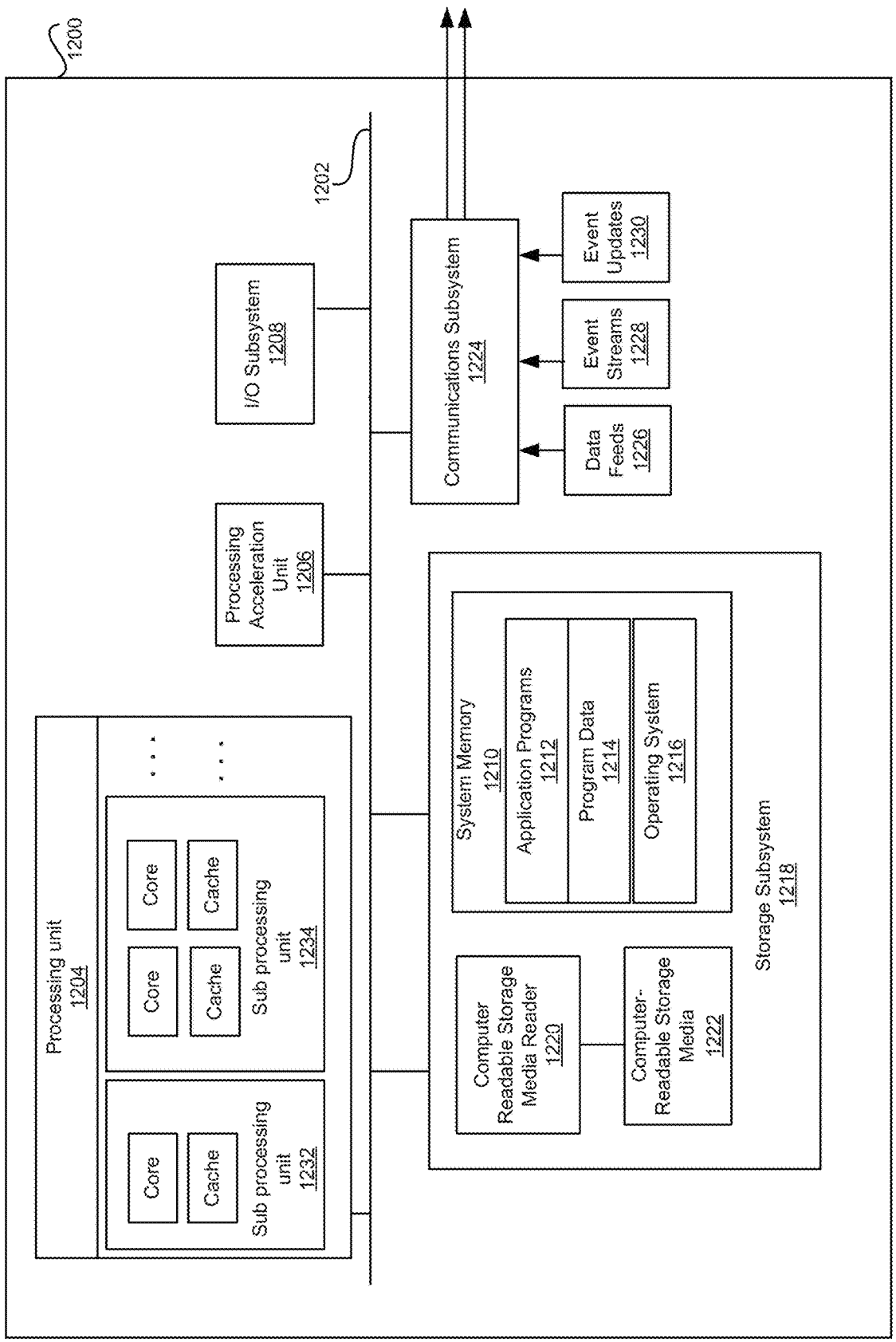
FIG. 12 illustrates an exemplary computer system, in which various embodiments of the present invention may be implemented.

FIG. 12 illustrates an exemplary computer system 1200, in which various embodiments of the present invention may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that comprises software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1218 may also provide a tangible computer-readable storage medium for storing the basic programming and data constructs that provide the functionality of some embodiments. Software (programs, code modules, instructions) that when executed by a processor provide the functionality described above may be stored in storage subsystem 1218. These software modules or instructions may be executed by processing unit 1204. Storage subsystem 8112 may also provide a repository for storing data used in accordance with the present invention.

Storage subsystem 1200 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1200.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 924 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 1202.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
running an instance of an application environment in a production environment, wherein the application environment includes a plurality of components, and wherein each component of the plurality of components includes one or more objects;
detecting one or more updates configured to modify at least one object of a component of the plurality of components;
in response to detecting the one or more updates, accessing an update server to retrieve the one or more updates;
automatically generating a new instance of the application environment;
installing the one or more updates on the new instance of the application environment;
identifying metadata associated with the instance, the metadata characterizing each object of the one or more objects of each component of the plurality of components associated with the instance;
identifying new metadata associated with the new instance, the new metadata characterizing each object of the one or more objects of each component of the plurality of components associated with the new instance, and the new metadata characterizing a version of the at least one object of the component having been updated with the one or more updates;

comparing the metadata associated with the instance with the new metadata associated with the new instance, wherein the comparison is performed while the instance of the application environment is running in the production environment;

determining, based on a result of the comparison, one or more differences between the metadata associated with the instance with the new metadata associated with the new instance, wherein the one or more differences identifies the at least one object of the component that has been updated based on the one or more updates;

generating update data that includes each of the one or more identified differences; and updating the instance of the application environment using the update data by incorporating the one or more identified differences into the instance, wherein updating the instance includes modifying the at least one object identified by the one or more differences, and wherein the at least one identified object is updated based on the new metadata.

2. The computer-implemented method of claim 1, wherein updating the instance further comprises:

initiating a lock period during which all transactions associated with an application running in the application environment are stopped;

updating the instance with the update data during the lock period; and releasing the lock period, the release of the lock period enabling transactions associated with the application to continue.

3. The computer-implemented method of claim 1, wherein the metadata includes a first set of bug numbers associated with the instance, wherein the new metadata includes a second set of bug numbers associated with the new instance, wherein when the first set of bug numbers is different from the second set of bug numbers, a difference between the first set and the second set corresponds to one or more bug fixes included in the one or more updates.

4. The computer-implemented method of claim 3, wherein the at least one object having been updated based on the new metadata is associated with the one or more bug fixes included in the one or more updates.

5. The computer-implemented method of claim 1, wherein detecting the one or more updates stored on a central server includes periodically polling the central server for updates at a regular or irregular interval.

6. The computer-implemented method of claim 1, wherein the metadata is associated with source code without the one or more updates, and wherein the new metadata is associated with the source code with the one or more updates.

7. The computer-implemented method of claim 1, further comprising:

rebooting the updated instance.

8. A system, comprising:

one or more processors; and a non-transitory computer-readable storage medium containing instructions configured to cause the one or more processors to perform operations including:

running an instance of an application environment in a production environment, wherein the application environment includes a plurality of components, and wherein each component of the plurality of components includes one or more objects;

detecting one or more updates configured to modify at least one object of a component of the plurality of components;

in response to detecting the one or more updates, accessing an update server to retrieve the one or more updates;

automatically generating a new instance of the application environment;

installing the one or more updates on the new instance of the application environment;

identifying metadata associated with the instance, the metadata characterizing each object of the one or more objects of each component of the plurality of components associated with the instance;

identifying new metadata associated with the new instance, the new metadata characterizing each object of the one or more objects of each component of the plurality of components associated with the new instance, and the new metadata characterizing a version of the at least one object of the component having been updated with the one or more updates;

comparing the metadata associated with the instance with the new metadata associated with the new instance, wherein the comparison is performed while the instance of the application environment is running in the production environment;

determining, based on a result of the comparison, one or more differences between the metadata associated with the instance with the new metadata associated with the new instance, wherein the one or more differences identifies the at least one object of the component that has been updated based on the one or more updates;

generating update data that includes each of the one or more identified differences; and updating the instance of the application environment using the update data by incorporating the one or more identified differences into the instance, wherein updating the instance includes modifying the at least one object identified by the one or more differences, and wherein the at least one identified object is updated based on the new metadata.

9. The system of claim 8, wherein updating the instance further comprises:

initiating a lock period during which all transactions associated with an application running in the application environment are stopped;

updating the instance with the update data during the lock period; and releasing the lock period, the release of the lock period enabling transactions associated with the application to continue.

10. The system of claim 8, wherein the metadata includes a first set of bug numbers associated with the instance, wherein the new metadata includes a second set of bug numbers associated with the new instance, wherein when first set of bug numbers is different from the second set of bug numbers, a difference between the first set and the second set corresponds to one or more bug fixes included in the one or more updates.

11. The system of claim 10, wherein the at least one object having been updated based on the new metadata is associated with the one or more bug fixes included in the one or more updates.

12. The system of claim 8, wherein detecting the one or more updates stored on a central server includes periodically polling the central server for updates at a regular or irregular interval.

13. The system of claim 8, wherein the metadata is associated with source code without the one or more updates, and wherein the new metadata is associated with the source code with the one or more updates.

14. The system of claim 8, further comprising:
rebooting the updated instance.

15. A computer-program product tangibly embodied in a non-transitory computer-readable storage medium, including instructions configured to cause a processing apparatus to perform operations including:
running an instance of an application environment in a production environment, wherein the application environment includes a plurality of components, and wherein each component of the plurality of components includes one or more objects;
detecting one or more updates configured to modify at least one object of a component of the plurality of components;
in response to detecting the one or more updates, accessing an update server to retrieve the one or more updates;
automatically generating a new instance of the application environment;
installing the one or more updates on the new instance of the application environment;
identifying metadata associated with the instance, the metadata characterizing each object of the one or more objects of each component of the plurality of components associated with the instance;
identifying new metadata associated with the new instance, the new metadata characterizing each object of the one or more objects of each component of the plurality of components associated with the new instance, and the new metadata characterizing a version of the at least one object of the component having been updated with the one or more updates;
comparing the metadata associated with the instance with the new metadata associated with the new instance, wherein the comparison is performed while the instance of the application environment is running in the production environment;
determining, based on a result of the comparison, one or more differences between the metadata associated with the instance with the new metadata associated with the new instance, wherein the one or more differences identifies the at least one object of the component that has been updated based on the one or more updates;
generating update data that includes each of the one or more identified differences; and
updating the instance of the application environment using the update data by incorporating the one or more identified differences into the instance, wherein updating the instance includes modifying the at least one object identified by the one or more differences, and wherein the at least one identified object is updated based on the new metadata.

16. The computer-program product of claim 15, wherein updating the instance further comprises:
initiating a lock period during which all transactions associated with an application running in the application environment are stopped;
updating the instance with the update data during the lock period; and
releasing the lock period, the release of the lock period enabling transactions associated with the application to continue.

17. The computer-program product of claim 15, wherein the metadata includes a first set of bug numbers associated with the instance, wherein the new metadata includes a second set of bug numbers associated with the new instance, wherein when first set of bug numbers is different from the second set of bug numbers, a difference between the first set and the second set corresponds to one or more bug fixes included in the one or more updates.

18. The computer-program product of claim 17, wherein the at least one object having been updated based on the new metadata is associated with the one or more bug fixes included in the one or more updates.

19. The computer-program product of claim 15, wherein detecting the one or more updates stored on a central server includes periodically polling the central server for updates at a regular or irregular interval.

20. The computer-program product of claim 15, wherein the metadata is associated with source code without the one or more updates, and wherein the new metadata is associated with the source code with the one or more updates.

* * * * *